United States Patent
Morita

(10) Patent No.: US 10,748,691 B2
(45) Date of Patent: Aug. 18, 2020

(54) OXIDE SUPERCONDUCTING BULK MAGNET

(71) Applicant: NIPPON STEEL & SUMITOMO METAL CORPORATION, Tokyo (JP)

(72) Inventor: Mitsuru Morita, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 85 days.

(21) Appl. No.: 15/758,852

(22) PCT Filed: Sep. 29, 2016

(86) PCT No.: PCT/JP2016/078924
§ 371 (c)(1),
(2) Date: Mar. 9, 2018

(87) PCT Pub. No.: WO2017/057634
PCT Pub. Date: Apr. 6, 2017

(65) Prior Publication Data
US 2018/0301260 A1    Oct. 18, 2018

(30) Foreign Application Priority Data

Oct. 2, 2015 (JP) .................................. 2015-196577

(51) Int. Cl.
| | | |
|---|---|---|
| *H01F 6/06* | (2006.01) | |
| *H01B 12/00* | (2006.01) | |
| *C01G 3/00* | (2006.01) | |
| *C01G 1/00* | (2006.01) | |
| *C04B 35/45* | (2006.01) | |

(Continued)

(52) U.S. Cl.
CPC .................. *H01F 6/06* (2013.01); *C01G 1/00* (2013.01); *C01G 3/00* (2013.01); *C04B 35/4508* (2013.01);
(Continued)

(58) Field of Classification Search
CPC ... H01F 6/06; H01F 1/053; H01F 6/00; H01F 7/02; C01F 1/00; H01B 12/00; Y02E 40/64
See application file for complete search history.

(56) References Cited

U.S. PATENT DOCUMENTS

| | | | |
|---|---|---|---|
| 5,920,246 A | 7/1999 | Nagashima et al. | |
| 2003/0213611 A1* | 11/2003 | Morita ................ | H01B 12/02 174/126.2 |

(Continued)

FOREIGN PATENT DOCUMENTS

| | | |
|---|---|---|
| CN | 101593597 A | 12/2009 |
| JP | 9-255333 A | 9/1997 |

(Continued)

OTHER PUBLICATIONS

English translation of the Japanese Office Action dated Nov. 20, 2018, for corresponding Japanese Application No. 2017-543593.

(Continued)

*Primary Examiner* — Paul A Wartalowicz
(74) *Attorney, Agent, or Firm* — Birch, Stewart, Kolasch & Birch, LLP

(57) ABSTRACT

The present invention provides an oxide superconducting bulk magnet which can obtain a sufficient amount of total magnetic flux, by preventing the superconducting bulk body from being broken due to electromagnetic stress and quenching phenomenon to enable magnetization by a strong magnetic field.

An oxide superconducting bulk magnet comprising an oxide superconducting bulk body wherein $RE_2BaCuO_5$ is dispersed in a monocrystalline $RE_1Ba_2Cu_3O_y$; and an outer peripheral reinforcing ring fitted to the outer periphery of the oxide superconducting bulk body, wherein the outer peripheral reinforcing ring is made of a plurality of metal rings having a multiple ring structure in the radial direction, (Continued)

at least one of the plurality of metal rings has a thermal conductivity of 20 W/(m·K) or more at a temperature of 20 to 70 K and at least one of the plurality of metal rings has a higher strength than the metal ring having a thermal conductivity of 20 W/(m·K) or more.

19 Claims, 10 Drawing Sheets

(51) Int. Cl.
    *C04B 35/626*     (2006.01)
    *C04B 35/653*     (2006.01)
    *H01F 1/34*     (2006.01)

(52) U.S. Cl.
    CPC ...... *C04B 35/62645* (2013.01); *C04B 35/653* (2013.01); *H01B 12/00* (2013.01); *H01F 1/342* (2013.01); *C04B 2235/3224* (2013.01); *C04B 2235/3282* (2013.01); *C04B 2235/96* (2013.01); *Y02E 40/64* (2013.01)

(56) References Cited

U.S. PATENT DOCUMENTS

2012/0231958 A1     9/2012   Morita et al.
2016/0155554 A1     6/2016   Morita et al.

FOREIGN PATENT DOCUMENTS

| | | | | |
|---|---|---|---|---|
| JP | 10-310497 | A | 11/1998 | |
| JP | 11-284236 | A | 10/1999 | |
| JP | 11-335120 | A | 12/1999 | |
| JP | 2003-173718 | A | 6/2003 | |
| JP | 2005-294471 | A | 10/2005 | |
| JP | 2006-332499 | A | 12/2006 | |
| JP | 2011-138823 | A | 7/2011 | |
| JP | 2011-142303 | * | 7/2011 | ............ C01G 1/00 |
| JP | 2014-76622 | A | 4/2014 | |
| JP | 2014-148760 | A | 6/2014 | |
| JP | 2014-165382 | A | 9/2014 | |
| WO | WO 2011/071071 | A1 | 6/2011 | |
| WO | WO 2014/189043 | A1 | 11/2014 | |

OTHER PUBLICATIONS

English translations of the Written Opinion of the International Searching Authority and International Search Report (forms PCT/ISA/237 and PCT/ISA/210), dated Dec. 6, 2016, for International Application No. PCT/JP2016/078924.

Extended European Search Report, dated Apr. 11, 2019, for corresponding European Application No. 16851805.8.

* cited by examiner (EXAMPLE 1)

(COMPARATIVE EXAMPLE 1)

(EXAMPLE 2)

(COMPARATIVE EXAMPLE 2)

(EXAMPLE 4)

(COMPARATIVE EXAMPLE 4)

(EXAMPLE 5)

(COMPARATIVE EXAMPLE 5)

OXIDE SUPERCONDUCTING BULK MAGNET

TECHNICAL FIELD

The present invention relates to an oxide superconducting bulk magnet comprising a superconducting bulk body and a reinforcement member.

BACKGROUND TECHNOLOGY

Since an oxide superconducting material wherein $RE_2BaCuO_5$ phase is dispersed in a monocrystalline $REBa_2Cu_3O_{7-x}$ phase, where RE is a rare earth element, has a high critical current density (hereinafter sometimes referred to as "Jc"), it can be used as a superconducting bulk magnet which is excited by cooling in a magnetic field or the like to generate a strong magnetic field.

A superconducting bulk magnet has an excellent characteristic that a very strong magnetic field can be generated in a compact space. However, since the very strong magnetic field is confined in the compact space, a large electromagnetic stress will act inside the superconducting bulk body. This electromagnetic stress is also referred to as a hoop stress because it acts to spread the confined magnetic field. In the case of a strong magnetic field of 5 to 10 T class, the acting electromagnetic stress may exceed the mechanical strength of the material of the superconducting bulk body itself, and as a result, there is a possibility that the superconducting bulk body may be broken. If the superconducting bulk body is broken, the superconducting bulk body cannot generate a strong magnetic field.

If it is possible to prevent breakage of the superconducting bulk body, it is possible to take advantage of the superconducting bulk magnet which can be compact and can generate a strong magnetic field. The superconducting bulk magnet is expected to be useful in applications utilizing a magnet member for compact NMR (Nuclear Magnetic Resonance), or the drug delivery system using magnetic force, in order to achieve high performance of the resulting apparatus, as well as miniaturization and weight reduction of the resulting apparatus.

In order to prevent breakage of the superconducting bulk body by electromagnetic force, for example, Patent Document 1 proposes a superconducting bulk magnet composed of a columnar superconducting bulk body and a metal ring surrounding it. By adopting such a configuration, compressive stress due to the metal ring is applied to the superconducting bulk body when being cooled, and such a compressive stress has the effect of reducing the electromagnetic stress, so that cracking of the superconducting bulk body can be suppressed. Thus, Patent Document 1 shows that breakage of a columnar superconducting bulk body can be prevented.

Incidentally, in order to generate a high-strength magnetic field by magnetization using a monocrystalline oxide superconducting material having a general size (for example, a diameter of about 40 to 100 mm), it is effective to make each of the monocrystalline oxide superconducting material into a ring shape and to generate a strong magnetic field within the ring.

Generally, by machining a disk-like bulk material into a ring shape, it is possible to utilize a uniform magnetic field having a relatively high strength inside the ring. This makes it possible to apply to NMR or MRI (Magnetic Resonance Imaging), etc. where particularly high uniformity is required.

For example, Patent Document 2 discloses a superconducting magnetic field generating element obtained by combining seven hexagonal superconducting bulk bodies, disposing a reinforcing member made of a fiber reinforced resin or the like around the hexagonal superconducting bulk bodies, and further disposing a support member made of a metal such as stainless steel or aluminum alloy around the outer periphery thereof. Patent Document 3 discloses an oxide superconducting bulk magnet wherein a ring-shaped bulk superconducting bodies having a thickness in the c-axis direction of the crystal axis of 0.3 to 15 mm are laminated to each other. In addition, Patent Document 4 discloses a superconducting bulk magnet wherein a plurality of ring-shaped superconducting bodies of which their outer periphery and inner periphery are reinforced, are laminated. Further, Patent Document 5 discloses a superconducting bulk magnet wherein superconducting bodies having a multiple ring structure in the radial direction are laminated. In addition, Patent Document 6 discloses a bulk magnet wherein the outer periphery, the upper surface and the lower surface of one bulk body are reinforced. In addition, Patent Document 7 discloses a method for pulse magnetizing a bulk superconducting body by providing on the peripheral lateral surface of the bulk superconducting body, a heat radiating member which is a combination of an inner tube with a cut section, made of an annular aluminum alloy and an outer tube having no cut section, made of annular stainless steel arranged on the outer peripheral side of the inner tube. In the ring-shaped bulk superconducting body subject to the pulse magnetization, there is a risk to generate excessive eddy currents in the ring, causing heat generation. To prevent the excessive eddy currents, an inner tube made of an annular aluminum alloy is provided with the cut section.

PRIOR ART DOCUMENT

Patent Document

Patent Document 1: Japanese Unexamined Patent Publication (kokai) No. 11-335120
Patent Document 2: Japanese Unexamined Patent Publication (kokai) No. 11-284238
Patent Document 3: Japanese Unexamined Patent Publication (kokai) No. 10-310497
Patent Document 4: Japanese Unexamined Patent Publication (kokai) No. 2014-75522
Patent Document 5: International Patent Publication WO2011/071071
Patent Document 6: Japanese Unexamined Patent Publication (kokai) No. 2014-146760
Patent Document 7: Japanese Unexamined Patent Publication (kokai) No. 2006-332499

SUMMARY OF THE INVENTION

Problem to be Solved by the Invention

However, regarding breakage of the magnetized bulk magnets or the bulk magnets in the magnetization process, no document which discloses a possible cause other than electromagnetic stress is found. The inventors of the present invention keenly studied about breakage of the magnetized bulk magnets or the bulk magnets in the magnetizing process, and as a result, ascertained that a mechanism of breakage due to quenching phenomenon exists besides the electromagnetic stress. Breakage due to this quenching phenomenon has not been known in the RE based bulk magnet.

In superconducting magnets fabricated by winding a superconducting wire into a coil, it is known that metal and oxide superconducting wires are broken by quenching phenomenon, and thus countermeasures such as combined processing with a stabilizing metal and the like are taken. However, in the case of an oxide superconducting material wherein $RE_2BaCuO_5$ phase is dispersed in a monocrystalline $REBa_2Cu_3O_{7-x}$ phase, due to its large degree of freedom of the superconducting current path, the quenching phenomenon has been observed in a low temperature region of about 10 K or less, but not in a high temperature region of about 20 K or more. In addition, it has been thought that breakage due to quenching phenomenon occurred such as in the wire coil magnet, etc. would not be occurred for the oxide superconducting material as described above.

However, according to the studies of the inventors of the present application, local heat generation (movement of magnetic flux) such as during a magnetization process and temperature elevating process triggers also in the bulk magnet, a local reduction of the critical current density Jc occurs. Furthermore, it was newly found that a cycle in which the reduction of the critical current density Jc brings about heat generation (movement of magnetic flux), occurs in an extremely short time, the energy of the trapped magnetic field is instantaneously released as heat, and breakage due to this heat impact, etc. may occur. Therefore, it is necessary to realize a bulk magnet capable of generating a strong magnetic field by suppressing breakage of the bulk magnet due to quenching phenomenon, in addition to reinforcing the magnet against the electromagnetic stress.

The present invention has been made in view of the above problems, and an object of the present invention is to provide an oxide superconducting bulk magnet which can generate a strong magnetic field to obtain a sufficient amount of total magnetic flux, by preventing the superconducting bulk body from being broken due to electromagnetic stress and quenching phenomenon.

Means for Solving the Problems

In order to solve the above problems, the inventors of the present invention made intensive investigations, and as a result, found that it is possible to prevent breakage of the superconducting bulk body due to quenching phenomenon even under a low temperature and a high magnetic field, by reinforcing a bulk magnet against electromagnetic stress, and then disposing a metal having a high thermal conductivity around the bulk magnet in a sufficient thermal contact with the bulk magnet in order to reduce the thermal and magnetic instability which can trigger the quenching phenomenon. Accordingly, the present invention has been made.

The summary of the present invention is as follows.

(1) An oxide superconducting bulk magnet comprising
an oxide superconducting bulk body wherein $RE_2BaCuO_5$ is dispersed in a monocrystalline $RE_1Ba_2Cu_3O_y$, in which RE is one or more elements selected from Y or a rare earth element, and $6.8 \leq y \leq 7.1$; and
an outer peripheral reinforcing ring fitted to the outer periphery of the oxide superconducting bulk body,
wherein the outer peripheral reinforcing ring is made of a plurality of metal rings having a multiple ring structure in the radial direction,
at least one of the plurality of metal rings has a thermal conductivity of 20 W/(m·K) or more at a temperature of 20 to 70 K and at least one of the plurality of metal rings has a higher strength than the metal ring having a thermal conductivity of 20 W/(m·K) or more.

(2) The oxide superconducting bulk magnet according to item (1), wherein the metal ring at the innermost periphery among the plurality of metal rings is a metal ring having a thermal conductivity of 20 W/(m·K) or more at a temperature 20 to 70 K.

(3) The oxide superconducting bulk magnet according to item (1) or (2), wherein the material of the metal ring having a thermal conductivity of 20 W/(m·K) or more is of copper, aluminum or silver.

(4) The oxide superconducting bulk magnet according to any one of items (1) to (3), wherein the material of the metal ring having a higher strength than the metal ring having a thermal conductivity of 20 W/(m·K) or more is of copper alloy, aluminum alloy or stainless steel.

(5) The oxide superconducting bulk magnet according to any one of items (1) to (4), wherein the metal ring at the innermost periphery among the plurality of metal rings and the oxide superconducting bulk body are bonded with Sn based solder.

(6) The oxide superconducting bulk magnet according to item (5), wherein a thin film layer of silver or a silver alloy is interposed at the interface between the oxide superconducting bulk body and the solder.

(7) The oxide superconducting bulk magnet according to any one of items (1) to (6), wherein a reinforcing plate made of copper, aluminum or silver is connected to the oxide superconducting bulk magnet such that the reinforcing plate covers at least one of the upper surface and the lower surface of the oxide superconducting bulk magnet.

(8) The oxide superconducting bulk magnet according to any one of items (1) to (7), wherein the oxide superconducting bulk body has a columnar shape and the outer peripheral reinforcing ring has a tubular shape.

(9) The oxide superconducting bulk magnet according to any one of items (1) to (7), wherein the oxide superconducting bulk body has a tubular shape and the outer peripheral reinforcing ring has a tubular shape.

(10) The oxide superconducting bulk magnet according to any one of items (1) to (7), wherein the oxide superconducting bulk body has a polygonal columnar shape and the outer peripheral reinforcing ring has a polygonal tubular shape.

(11) An aggregated oxide superconducting bulk magnet comprising
an aggregate formed by making the oxide superconducting bulk magnet according to any one of items (1) to (10) as a bulk magnet unit and arranging a plurality of the bulk magnet units in parallel, and
an outer peripheral reinforcing body of the aggregate, covering an outer periphery of the aggregate,
wherein the aggregate is formed so that the outer peripheral reinforcing rings of adjacent bulk magnet units are in contact with each other in parallel arrangement, wherein the outer peripheral reinforcing body of the aggregate is formed of a member having a higher strength than the metal ring having a thermal conductivity of 20 W/m·K or more at a temperature of 20 K to 70 K in the outer peripheral reinforcing ring.

Effect of the Invention

As described above, according to the present invention, it is possible to provide an oxide superconducting bulk magnet which is capable of obtaining a sufficient total magnetic flux amount, by preventing breakage of the superconducting bulk body due to quench phenomenon or the like, in addition to obtaining a mechanical reinforcement effect against electromagnetic stress, even under a high magnetic field strength condition for securing a required high magnetic field region.

EMBODIMENTS FOR CARRYING OUT THE INVENTION

Figure 1A:
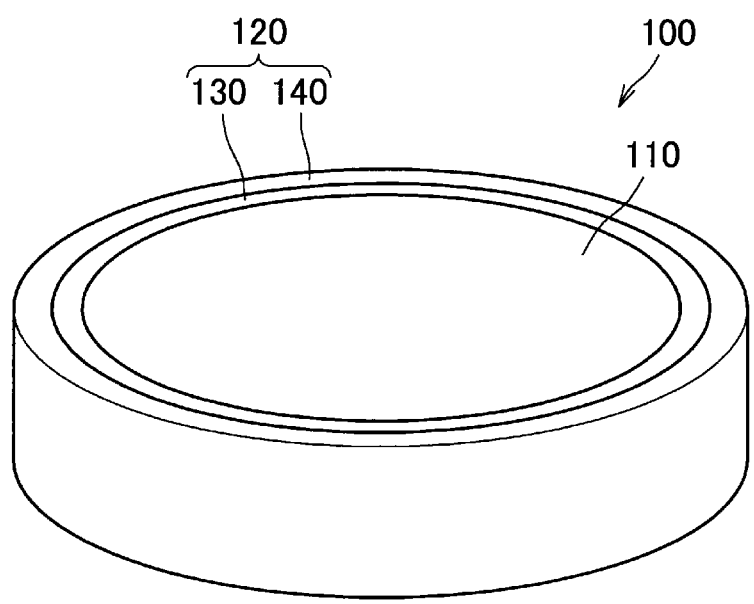
FIG. 1A is a schematic perspective view showing an example of an oxide superconducting bulk magnet according to a first embodiment of the present invention.

Preferred embodiments of the present invention will now be described in detail with reference to the accompanying drawings. In the present specification and the drawings, the same reference numerals are given to the constituent elements having substantially the same functional configuration to omit redundant explanations.

The oxide superconducting bulk body (hereinafter also simply referred to as "superconducting bulk body") used in the oxide superconducting bulk magnet according to the present embodiment is desirably a bulk material having a structure wherein a non-superconducting phase represented by $RE_2BaCuO_5$ phase (211 phase) or the like is dispersed in a monocrystalline $REBa_2Cu_3O_{7-x}$, particularly a finely dispersed structure (so-called QMG (registered trademark) material). Here, the term "monocrystalline" means not only a perfect mono-crystal phase but also those having defects which do not impair practical use, such as small angle grain boundaries. RE in $REBa_2Cu_3O_{7-x}$ phase (123 phase) and $RE_2BaCu_5$ phase (211 phase) is a rare earth element selected from the group consisting of Y, La, Nd, Sm, Eu, Gd, Dy, Ho, Er, Tm, Yb, Lu, and combinations thereof. The 123 phases including La, Nd, Sm, Eu, or Gd are deviated from the stoichiometric composition of 1:2:3, and Ba may partially be substituted in the site of RE. Also, in the 211 phase which is the non-superconducting phase, it is known that La and Nd, unlike Y, Sm, Eu, Gd, Dy, Ho, Er, Tm, Yb and Lu, have a metal element ratio of a non-stoichiometric composition, or have a different crystal structure from them.

Substitution of the Ba element as described above tends to lower the critical temperature. Also, substitution of Ba element tends to be suppressed in an environment with a lower oxygen partial pressure.

The 123 phase is formed by a peritectic reaction of 211 phase with a liquid phase composed of a composite oxide of Ba and Cu,

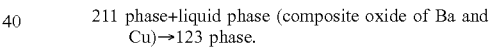

211 phase+liquid phase (composite oxide of Ba and Cu)→123 phase.

Then, due to this peritectic reaction, the temperature where the 123 phase can be formed (Tf: 123 phase generation temperature) generally relates to the ionic radius of the RE element, and Tf decreases as the ion radius decreases. In addition, Tf tends to decrease with the low oxygen atmosphere and Ag addition.

The material wherein the 211 phase is finely dispersed in the monocrystalline 123 phase can be formed because unreacted 211 grains are remained in the 123 phase during the 123 phase crystal growth. That is, the bulk material is formed by the following reaction.

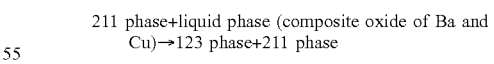

211 phase+liquid phase (composite oxide of Ba and Cu)→123 phase+211 phase

The fine dispersion of the 211 phase in the bulk material is extremely important from the viewpoint of improving the critical current density Jc. By adding a trace amount of at least one of Pt, Rh or Ce, the grain growth of the 211 phase in a semi-molten state (the state composed of the 211 phase and the liquid phase) is suppressed, and as a result, the 211 phase in the material is miniaturized to about 1 μm. The fine dispersion state of the 211 phase can be confirmed with an optical microscope after mirror polishing the sample.

From the viewpoints of the amount at which the miniaturization effect appears and the material cost, 0.2 to 2.0% by mass for Pt, 0.01 to 0.5% by mass for Rh or 0.5 to 2.0 for Ce is desirably added. Some portion of the added Pt, Rh or Ce is form a solid solution in the 123 phase. In addition, an element which cannot form a solid solution forms a composite oxide with Ba or Cu and is scattered in the material.

In addition, the bulk oxide superconducting body constituting the magnet needs to have a high critical current density (Jc) even in a magnetic field. In order to satisfy this condition, it is necessary to be a monocrystalline 123 phase which does not include a large angle grain boundary which forms a weak superconductive bond. In order to have even higher Jc characteristics, a pinning center for stopping a movement of magnetic flux is required. It is the 211 phase which is finely dispersed that functions as this pinning center, and it is preferable that a large number of the 211 phase particles are more finely dispersed. As mentioned earlier, Pt, Rh or Ce have a function to promote miniaturization of this 211 phase. In addition, as a pinning site, it is known that $BaCeO_3$, $BaSiO_3$, $BaGeO_3$, $BaSnO_3$ or the like are possible. In addition, a non-superconducting phase such as 211 phase mechanically strengthens the superconducting body due to its fine dispersion in the 123 phase which is easy to cleave, and it also plays an important role to establish a bulk material.

From the viewpoint of Jc characteristics and mechanical strength, the proportion of the 211 phase in the 123 phase is preferably 5 to 35% by volume. In addition, the material generally contains 5 to 20% by volume of voids (air bubbles) of about 50 to 500 µm. If Ag is added to the material, it contains Ag or Ag compound having a particle size of about 1 to 500 µm in an amount greater than 0 vol. % to 25 vol. %, depending on the amount added.

In addition, the oxygen deficiency amount (x) of the material after crystal growth is about 0.5, indicating a temperature-dependent change in semiconducting resistivity. By annealing this in each RE system at 350° C. to 600° C. for about 100 hours in an oxygen atmosphere, oxygen is taken into the material, the oxygen deficiency amount (x) becomes 0.2 or less, and the material indicates good superconducting properties. At this stage, a twin crystal structure is formed in the superconducting phase. However, a crystal structure including it at this stage will be referred to as a monocrystalline state.

Hereinafter, embodiments of the present invention will be described with reference to the drawings, by corresponding to the technical contents defined in the respective claims. The gist of the present invention is that by disposing a metal with a high thermal conductivity around and in an oxide superconducting bulk body having low thermal conductivity and sufficiently ensuring a thermal contact with the bulk body, the heat generated by the movement of the magnetic flux inside the superconducting body at the time of temperature rising during strong magnetic field magnetization and after the magnetization is released to the outside, for example, to the freezer or the like to suppress the occurrence of quenching phenomenon and further a basic structure of a bulk magnet having a mechanical strength capable of withstanding the electromagnetic stress caused by the strong magnetic field.

In the embodiment according to the present invention, it is conceived that the magnetization method is not a pulse magnetization method, but is a magnetization method, which is referred to as field cool method (cooling in a magnetic field), wherein a superconducting body is cooled in a steadily applied magnetic field, and after it becomes superconducting, the applied magnetic field is removed.

Specifically, the following embodiments can be mentioned.

First Embodiment

Figure 1B:
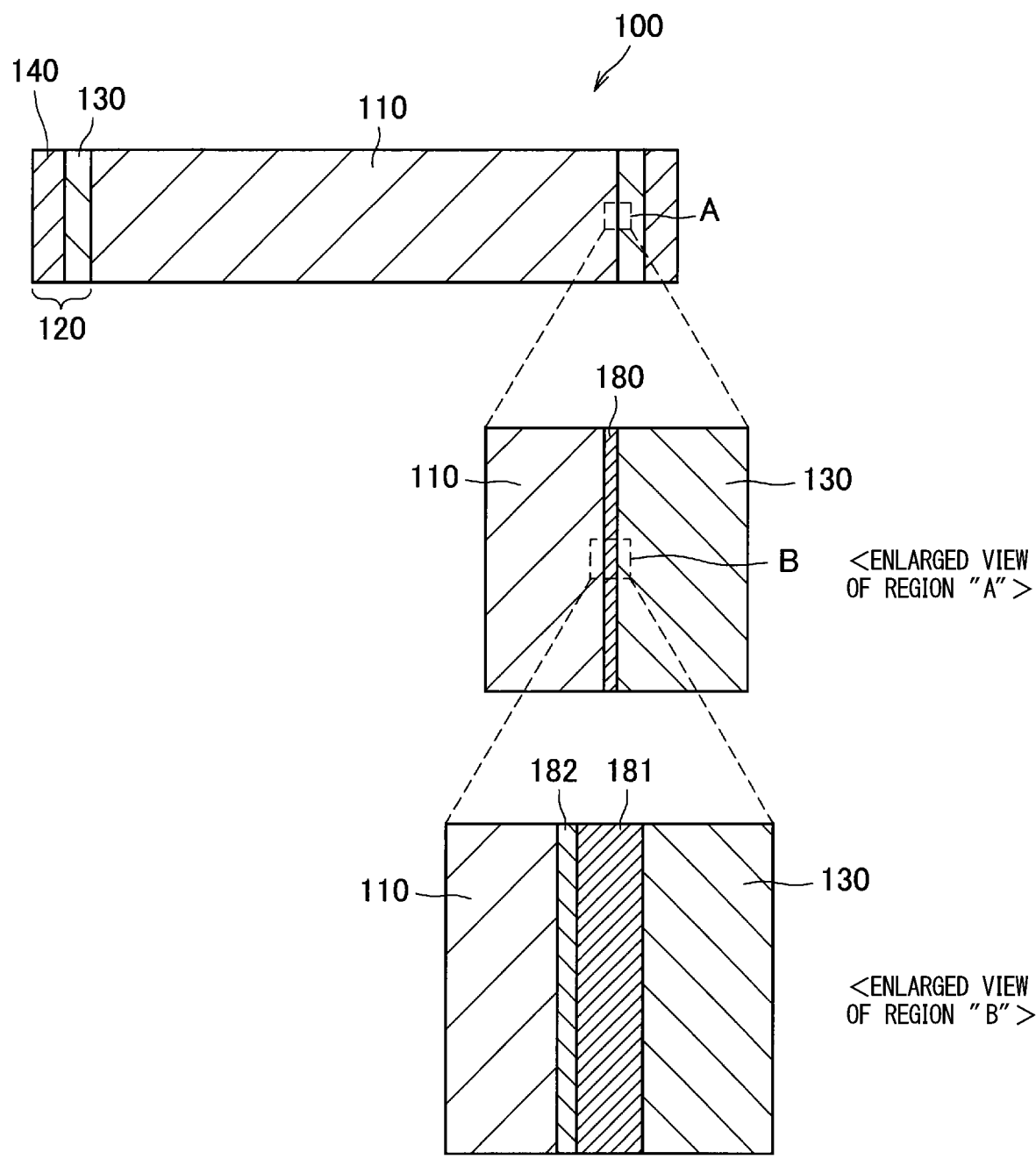
FIG. 1B is a cross-sectional view of the oxide superconducting bulk magnet shown in FIG. 1A and partial enlarged views showing an interface structure between the superconducting bulk body and the outer peripheral reinforcing ring in the regions A and B.

Firstly, a first embodiment will be described with reference to FIGS. 1A and 1B. FIG. 1A is a schematic perspective view showing an example of an oxide superconducting bulk magnet 100 according to this embodiment. FIG. 1B is a cross-sectional view of the oxide superconducting bulk magnet 100 shown in FIG. 1A, and a cross-sectional view and a partial enlarged view thereof showing the interface portion between the oxide superconducting body and the outer peripheral reinforcing ring.

The oxide superconducting bulk magnet 100 according to the present embodiment consists of a columnar oxide superconducting bulk body 110 and an outer peripheral reinforcing ring 120 having a metal multiple ring structure. The outer peripheral reinforcing ring 120 includes a first metal ring 130 having a high thermal conductivity and a second metal ring 140 having a strength higher than the strength of the first metal ring 130. The positional relationship between the first metal ring 130 and the second metal ring 140 and the respective thicknesses are design matters, and they may be appropriately selected according to usage conditions.

It is necessary that the oxide superconducting bulk body 110 is in sufficient contact with the innermost first metal ring 130, and is sufficiently thermally coupled at the interface portion with the outer peripheral reinforcing ring 120 (specifically, the first metal ring 130). As shown in the enlarged view of the region A in FIG. 1B, for example, a resin or grease may be filled between the oxide superconducting bulk body 110 and the first metal ring 130. More desirably, they have electrical conductivity and are bonded with an electrically conductive material 180 which provides a strong bonding force. The bonding by the conductive material 180 is preferably performed by soldering or the like. Here, the solder 182 is preferably an Sn-based solder having a relatively low melting point and hardly causing removal of oxygen in the superconducting phase. In addition, in the case of bonding by soldering, it is desirable to form a thin film of Ag (or Ag alloy) on the surface of the oxide superconducting bulk body 110 by sputtering or the like and anneal it at 100° C. to 500° C. This makes it difficult for the Ag thin film to be peeled off from the surface of the oxide superconducting bulk body 110, so that the Ag thin film is well attached to the surface. As a result, contact resistance at the interface between the superconducting phase and Ag may be reduced. As shown in the enlarged view of the region B in FIG. 1B, when the oxide superconducting bulk body 110 having the Ag thin film 182 formed on its surface is soldered to the first metal ring 130 with the solder 181, an intermetallic compound composed of Ag and a solder component is formed at the interface between the Ag thin film 182 and the solder 181. The interface is called "solder splashed" state, and it is thermally and electrically coupled sufficiently.

The bonding between respective rings 130 and 140 of the outer peripheral reinforcing ring 120 having a metal multiple ring structure needs to have sufficient thermal contact. For example, the bonding between the first metal ring 130 and the second metal ring 140 may be made of grease, resin, or the like, but it is desired that they are strongly and electrically bonded preferably using a solder or the like.

As a material of the first metal ring 130 having a high thermal conductivity, a metal such as copper, a copper alloy, aluminum, an aluminum alloy, silver, a silver alloy or the like having a thermal conductivity of about 20 W/(m·K) or higher is desirable. Here, copper, aluminum and silver refer to those having a purity of 99% or more, more preferably 99.9% or more. As a result, the thermal conductivity as a whole is increased, the thermal stability as a bulk magnet increases, and quench phenomenon hardly occurs. Therefore, high field magnetization in a lower temperature region, that is, a high critical current density Jc region becomes possible. When a thermal swing due to, for example, movement of quantized magnetic flux which locally degrades the superconducting characteristics occurs and the critical current density Jc locally lowers, since metals such as copper, aluminum, and Ag particularly have high electric conductivity, the effect of detouring the superconducting current is large and quench suppressing effect is high. In this case, it is desirable that the contact resistance of the interface between the oxide superconducting bulk body 110 and the metal ring of the outer peripheral reinforcing ring 120 having high-electrical conductivity be small. Due to the Ag thin film 182 on the surface of the oxide superconducting bulk body 110, this contact resistance can be reduced.

From the viewpoint of transfer and absorption of heat generated in the superconducting material, the thermal conductivity of the high-strength second metal ring 140 having a high thermal conductivity is preferably not less than 20 W/(m·K), more preferably not less than 100 W/(m·K) in the temperature range of 20 to 70 K, at which temperature, a strong magnetic field can stably be generated by freezer cooling or the like. Here, the reason why the temperature range is 20 K or more is that if the temperature is less than 20 K, the critical current density Jc increases to facilitate the generation of a strong magnetic field, but in general the specific heat decreases and quenching phenomenon tends to occur. The reason why the temperature range is not more than 70 K is because it is a temperature range where a high magnetic field of more than 5 T can be generated when assuming a diameter of several centimeters as a standard size bulk body.

In addition, the outer peripheral reinforcing ring 120 having a metal multiple ring structure also needs to have a function of preventing cracking due to electromagnetic stress when a high magnetic field is trapped. Therefore, in view of electrical conductivity, thermal conductivity and mechanical strength, it is necessary to design the material and the thickness, etc. of the ring with respect to the first metal ring 130 having a high thermal conductivity and the second metal ring 130 having a higher strength than the first metal ring 130, depending the specification to be intended. Since the first metal ring 130 and the second metal ring 140 have a shape with no cut portion, such as a tubular shape, high electrical conductivity, thermal conductivity and mechanical strength can be achieved. If pulse magnetization is adopted, excessive eddy currents may be occurred in the ring to generate heat. However, in the embodiment of the present invention adopting Field Cool magnetization, it is a quasi-static magnetization method as compared to pulse magnetization, and the problem of heat generation is largely reduced. Therefore, there is no need to provide a cut portion. In addition, the absence of a cut portion improves the strength of the material, making it possible to prevent breakage due to electromagnetic force. Further, in the case of solder connection, it is possible to adjust the bonding temperature between the outer peripheral reinforcing ring 120 and the oxide superconducting bulk body 110 by appropriately adjusting a melting point of the solder, and to adjust the effect of the cooling fit by the temperature difference up to the cooling temperature. This makes it possible to adjust the compressive stress in the circumferential direction and in the radial direction from the outer peripheral reinforcing ring 120 to the oxide superconducting bulk body 110 at the cooling temperature.

Metals such as copper, aluminum, silver and the like having a high thermal conductivity generally have a higher thermal conductivity as its purity increases. On the other hand, mechanical strength tends to decrease, accordingly. Therefore, the outer peripheral reinforcing ring 120 of the present embodiment forms a metal multiple ring structure wherein a metal ring having a high thermal conductivity and mainly playing a role of suppressing quenching phenomenon is combined with a metal ring having a low thermal conductivity but high mechanical strength and mainly playing a role of the reinforcement effect against the electromagnetic stresses. Thus, it is important in the present invention to use an outer peripheral reinforcing ring 120 capable of coping with both mechanical stress and quenching phenomenon.

From the above viewpoint, the mechanical strength at a temperature of 20 K to 70 K of the first metal ring 130 made of a metal material having a high thermal conductivity such as copper, aluminum, silver or the like is about 100 MPa, and the mechanical strength of the second metal ring 140 having a strength higher than the first metal ring 130 is more than 100 MPa, more desirably 200 MPa or more.

The thickness of the outer peripheral reinforcing ring 120 is a design matter related to the inner diameter of the magnet for magnetization, the cooling method and the like, but it is effective even at 1 mm, for example, and may be more than 20 mm if possible for design.

The oxide superconducting bulk magnet 100 according to this embodiment has been described above. According to the present embodiment, it comprises an oxide superconducting bulk body and an outer peripheral reinforcing ring 120 having a metal multiple ring structure fitted around the oxide superconducting bulk body. The outer peripheral reinforcing ring 120 has a high thermal conductivity, and at least any one of the metal rings has a thermal conductivity at a temperature of 20K to 70K of 20 W/(m·K) or more, whereby the metal rings are thermally connected to the oxide superconducting bulk body 110. As a result, it is possible to increase the thermal conductivity of the entire oxide superconducting bulk magnet, and realize a stable condition against electricity as well as quenching phenomenon by soldering connection or the like. Furthermore, it is possible to prevent cracking due to electromagnetic stress by a higher-strength metal ring, whereby breakage of the oxide superconducting bulk body 110 can be prevented even under a high magnetic field strength condition, and thus, an oxide superconducting bulk magnet 100 capable of achieving a sufficient total magnetic flux amount can be provided.

Second Embodiment

Figure 2:
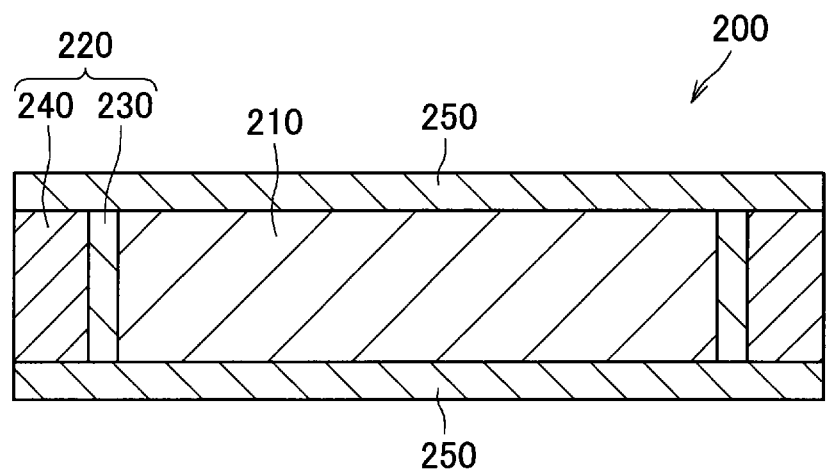
FIG. 2 shows a cross-sectional view of an example of an oxide superconducting bulk magnet according to a second embodiment of the present invention, which is taken along the center axis of the oxide superconducting bulk magnet.

Next, a second embodiment will be described with reference to FIG. 2. FIG. 2 is a cross-sectional view taken along the center axis of the oxide superconducting bulk magnet 200.

Compared to the first embodiment, the oxide superconducting bulk magnet 200 according to the present embodiment is different in that it has a reinforcing plate 250 having a high thermal conductivity also in at least one of the upper direction and the lower direction of the oxide superconducting bulk body 210, and this is thermally connected to the oxide superconducting bulk body 210. The material of the reinforcing plate 250 can be similar to that of the first metal ring 130 having high thermal conductivity of the outer peripheral reinforcing ring 120 as described in the first embodiment. In addition, the connection between the reinforcing plate 250 and the oxide superconducting bulk body 210 can be similar to the connection between the first metal ring 130 having high thermal conductivity of the outer peripheral reinforcing ring 120 described in the first embodiment and the oxide superconducting bulk body 110. The materials, shapes or the like of the first metal ring 230 and the second metal ring 240 of the outer peripheral reinforcing ring 220 can be similar to those of the first metal ring 130 and the second metal ring 140 of the outer peripheral reinforcing ring 120 having high thermal conductivity and high strength as described in the first embodiment.

By adopting the configuration of the second embodiment, although the volume and the weight of the bulk magnet increase as compared with the first embodiment, the thermal conductivity of the bulk magnet as a whole increases and the structure is such that quenching phenomenon can be more suppressed.

Third Embodiment

Figure 3A:
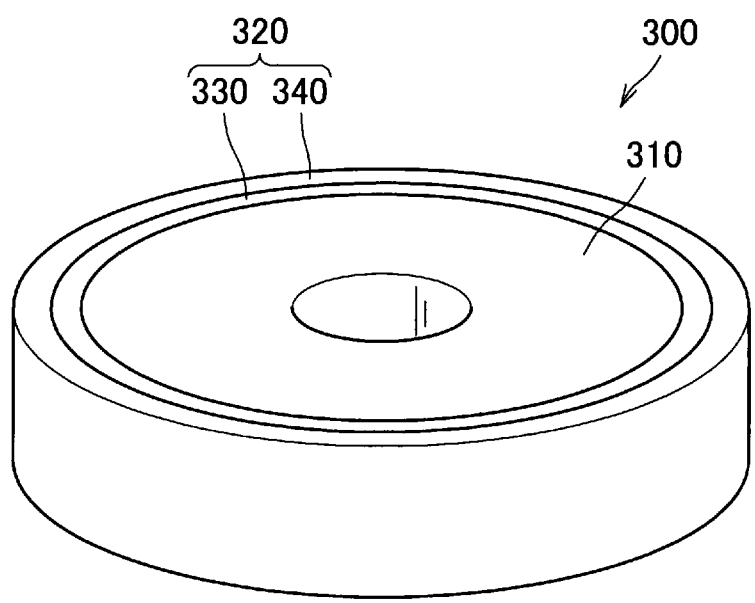
FIG. 3A is a schematic perspective view showing an example of a ring-shaped oxide superconducting bulk magnet according to a third embodiment of the present invention.
Figure 3B:
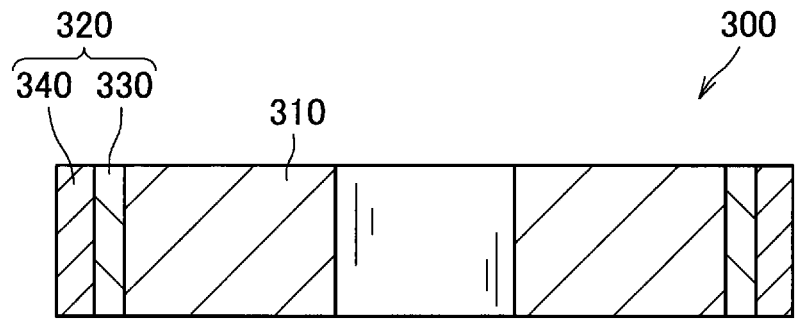
FIG. 3B is a cross-sectional view of the ring-shaped oxide superconducting bulk magnet shown in FIG. 3A.

Next, an oxide superconducting bulk magnet 300 according to a third embodiment will be described with reference to FIGS. 3A and 3B. FIG. 3A is a schematic perspective view showing an example of the oxide superconducting bulk magnet 300 according to the present embodiment. FIG. 3B is a cross-sectional view taken along the center axis of the oxide superconducting bulk magnet 300. The oxide superconducting bulk magnet 300 consists of a ring shaped oxide superconducting bulk body 310 and an outer peripheral reinforcing ring 320 consisting of a first metal ring 330 having a high thermal conductivity and a high strength second metal ring 340.

The connection between the first reinforcing ring 330 on the inner peripheral side of the outer peripheral reinforcing ring 320 having the metal multiple ring structure and the oxide superconducting bulk body 310 can be similar to the connection between the outer peripheral reinforcing ring 120 described in the first embodiment and the oxide superconducting bulk body 110. The materials, shapes or the like of the first metal ring 330 and the second metal ring 340 of the outer peripheral reinforcing ring 320 can be similar to the first metal ring 130 and the second metal ring 140 of the outer peripheral reinforcing ring 120 having high thermal conductivity and high strength described in the first embodiment.

With such a configuration, a space having a high magnetic flux density and high uniformity inside the ring can be obtained. The configuration of this embodiment is extremely important in NMR applications and the like.

Fourth Embodiment

Figure 4A:
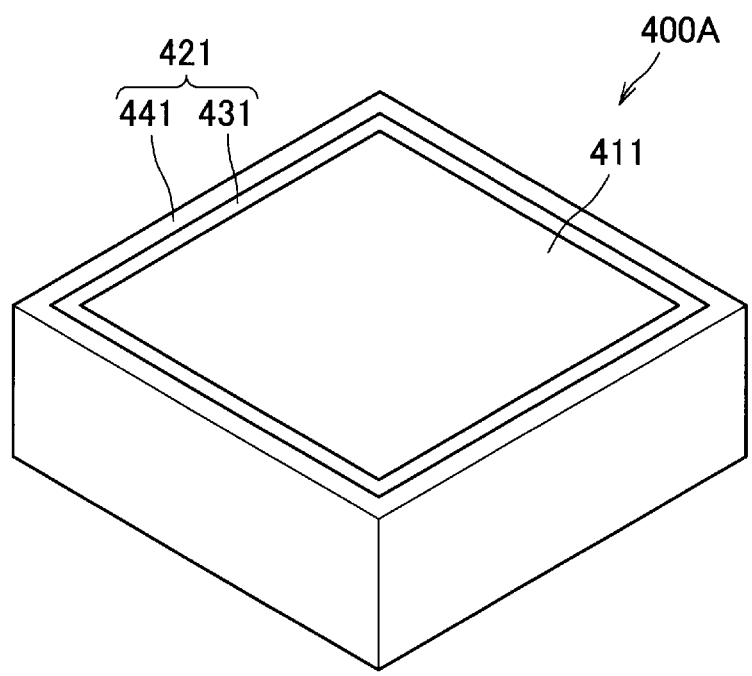
FIG. 4A is a schematic perspective view showing an example of an oxide superconducting bulk magnet according to a fourth embodiment of the present invention, which is an example of an oxide superconducting bulk magnet consisting of a quadrilateral superconducting bulk body and a quadrilateral outer peripheral reinforcing ring.
Figure 4B:
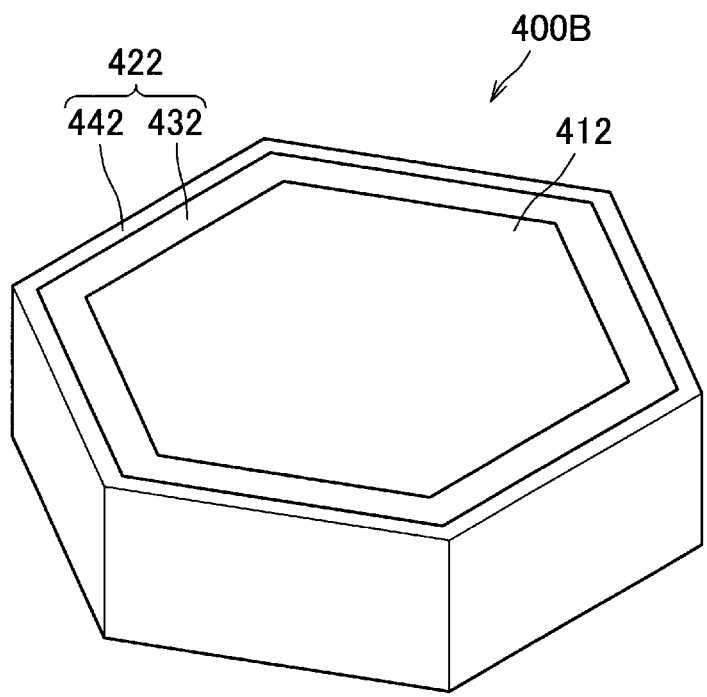
FIG. 4B is a schematic perspective view showing an example of an oxide superconducting bulk magnet according to the same embodiment, which is an example of an oxide superconducting bulk magnet consisting of a hexagonal superconducting bulk body and a hexagonal outer peripheral reinforcing ring.

Next, a fourth embodiment will be described with reference to FIG. 4A and FIG. 4B. FIG. 4A is a schematic perspective view showing an example of the oxide superconducting bulk magnet 400 according to this embodiment. The oxide superconducting bulk magnet 400 in FIG. 4A is composed of a polygonal columnar superconducting bulk body and an outer peripheral reinforcing ring having a polygonal tubular metal multiple ring structure. FIG. 4B is a schematic perspective view showing an example of the oxide superconducting bulk magnet 400 according to this embodiment, which is composed of a hexagonal superconducting bulk body and an outer peripheral reinforcing ring having a hexagonal metal multiple ring structure.

The outer peripheral reinforcing rings 421 and 422 having the metal multiple ring structure shown in FIGS. 4A and 4B can be similar to the outer peripheral reinforcing ring 120 described in the first embodiment. In addition, the connection between the outer peripheral reinforcing rings 421 and 422, and the oxide superconducting bulk bodies 411 and 412 may be similar to the connection between the outer peripheral reinforcing ring 120 and the oxide superconducting bulk body 110 described in the first embodiment. Further, the material, shape, and the like of the first metal rings 431 and 432 and the second metal rings 441 and 442 of the outer peripheral reinforcing rings 421 and 422 may be similar to the first metal ring 130 and the second metal ring 140 of the outer peripheral reinforcing ring 120 having the high thermal conductivity and high strength, as described in the first embodiment.

With such a configuration, a plurality of bulk magnets can be densely arranged on a plane, and a high magnetic field can be generated in a larger space.

Fifth Embodiment

Figure 5:
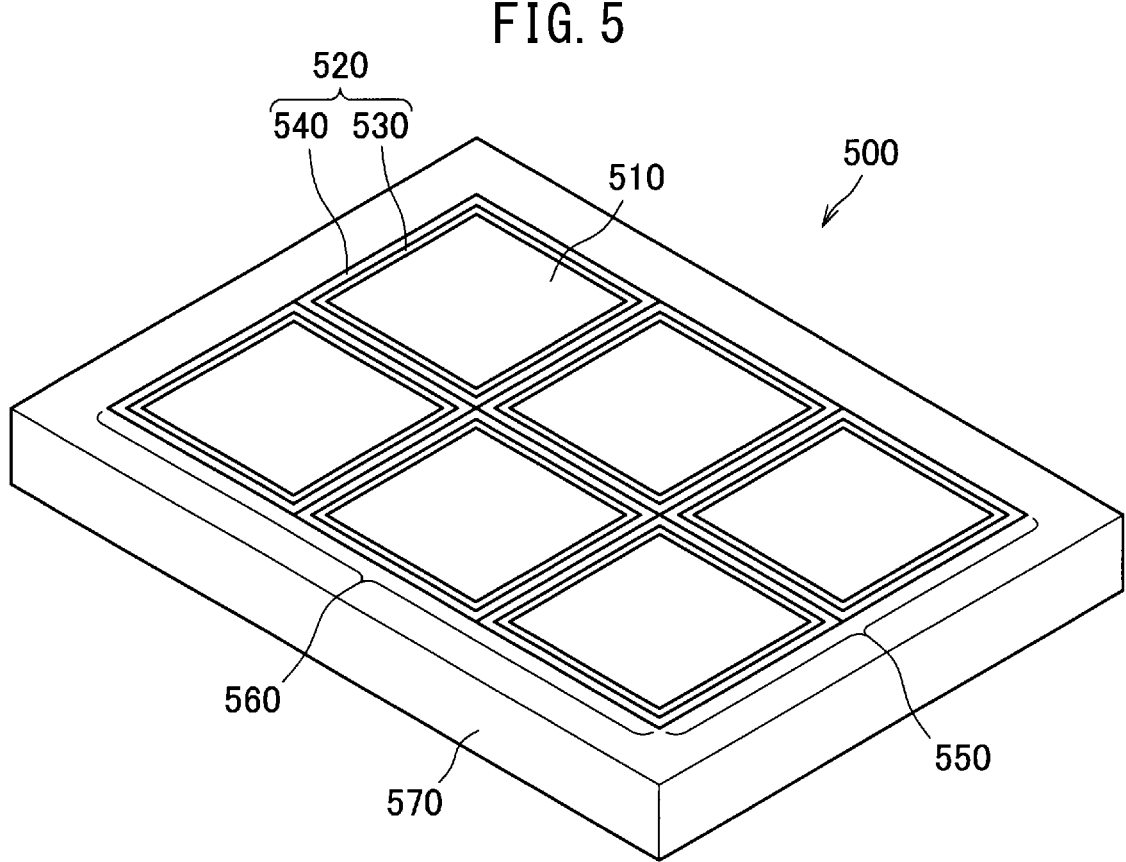
FIG. 5 is a schematic perspective view showing an example of an oxide superconducting bulk magnet according to a fifth embodiment of the present invention, which is an example wherein a plurality of quadrilateral oxide superconducting bulk bodies are connected to quadrilateral outer peripheral reinforcing rings comprising quadrilateral metal rings having a high thermal conductivity, and wherein an outer peripheral reinforcing ring having a high strength is attached to the outer periphery of the aggregate of the plurality of bulk magnets.

Next, a fifth embodiment will be described with reference to FIG. 5. FIG. 5 is a schematic perspective view showing an example of an aggregate-type oxide superconducting bulk magnet 500 according to this embodiment. In the aggregate-type oxide superconducting bulk magnet 500 shown in FIG. 5, the polygonal columnar oxide superconducting bulk body 510 is thermally connected to an outer peripheral reinforcing ring 520 having a polygonal tubular metal multiple ring structure to obtain a bulk magnet unit. Then, a plurality of bulk magnet units are arranged to form an aggregate 560, and an aggregate outer peripheral reinforcing ring 570 is disposed on the outer periphery of the aggregate 560 to form an aggregate-type oxide superconducting bulk magnet 500.

The outer peripheral reinforcing ring 520 may be similar to the outer peripheral reinforcing ring 120 described in the first embodiment, and the materials, shapes, and the like of the first metal ring 530 and the second metal ring 540 of the outer peripheral reinforcing ring 520 may be similar to those of the first metal ring 130 and the second metal ring 140 of the outer peripheral reinforcing ring 120 having the high thermal conductivity and high strength, as described in the first embodiment. The connection between the outer peripheral reinforcing ring 520 and the oxide superconducting bulk body 510 can be similar to the connection between the outer peripheral reinforcing ring 120 and the oxide superconducting bulk body 110 described in the first embodiment. The material, shape, and the like of the aggregate-type outer peripheral reinforcing ring 570 can be similar to those of the second metal ring 140 having higher strength than the first metal ring 130 described in the first embodiment. In addition, the connections between the adjacent outer peripheral reinforcing rings 520, and the outer peripheral reinforcing ring 520 and the aggregate outer peripheral reinforcing ring 570 on the outer periphery thereof can be similar to the connection between the outer peripheral reinforcing ring 120 and the oxide superconducting bulk body 110 described in the first embodiment.

In this way, by tightly bundling individual separate bulk magnets, it is easy to magnetize the entire aggregate at once, and as a result, an aggregated oxide superconducting bulk magnet 500 capable of generating a magnetic field having a high magnetic flux density over a wide area can be provided.

In addition, by using the oxide superconducting bulk magnets of the first to fifth embodiments described above, it is possible to prevent or suppress quenching phenomenon and to prevent breakage of the oxide superconducting bulk body due to electromagnetic stress even in Field Cool magnetization with a high magnetic field such as having a supplementary magnetic flux density on the axial surface of the oxide superconducting bulk body of 5 T or more, or even 8 T or more.

EXAMPLES

Example 1

Figure 6:
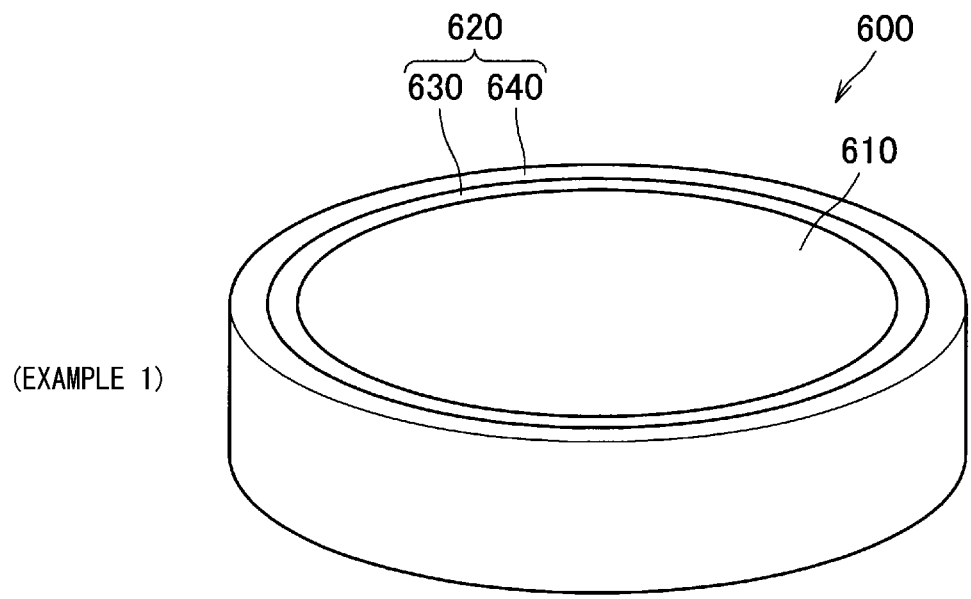
FIG. 6 are schematic perspective views of an oxide superconducting bulk magnet according to Example 1 and a comparative material with respect to Example 1.
Figure 6:
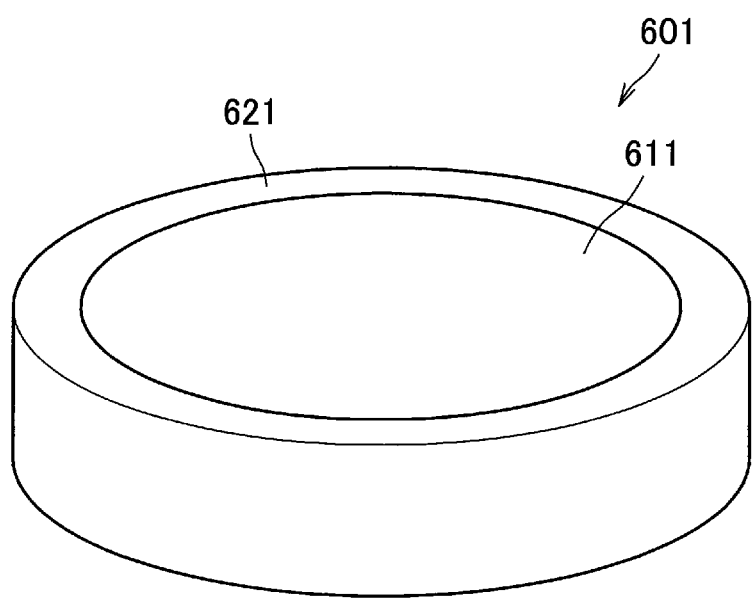

In the superconducting bulk magnet 600 of Example 1 shown in FIG. 6, Gd—Ba—Cu—O-based oxide superconducting bulk body 610 was used.

First, commercially available powders of an oxide of each of gadolinium (Gd), barium (Ba) and copper (Cu) having a purity of 99.9% by mass, were weighed and used to be mixed at a molar ratio of Gd:Ba:Cu=1:2:3. The resulting weighed powder was thoroughly kneaded for 1 hour after addition of 1.0% by mass of $CeO_2$, and then calcined for 8 hours at 1173 Kin an oxygen stream to obtain Gd based 123 powder.

Next, powders of oxides of gadolinium (Gd), barium (Ba) and copper (Cu) were weighed and used to be mixed at a molar ratio of Gd:Ba:Cu=2:1:1. The resulting weighed powder was thoroughly kneaded for 1 hour after addition of 1.0% by mass of $CeO_2$, and then calcined at 1203 K for 4 hours in oxygen flow to prepare Gd-based 211 powder. Further, the Gd-based 123 powder and the Gd-based 211 powder were weighed at a molar ratio of 3:1, and 10% by mass of silver oxide powder was added thereto. The resulting mixture was sufficiently mixed and a calcined powder was prepared.

Next, the calcined powder was molded into a disc shape using a metal mold. This compact was heated to 1423 K to form a melt, held for 30 minutes, and the melt was seeded in the course of temperature lowering. It was slowly cooled in the temperature range of 1278 K to 1252 K over 180 hours to conduct crystal growth. A monocrystalline oxide superconducting bulk body having a disk shape of a diameter of 55 mm in which the c-axis of crystal orientation of the superconducting phase is substantially parallel to the normal line of the disk plane was obtained. This monocrystalline oxide superconducting bulk body was processed into a columnar shape having an outer diameter of 50.0 mm and a height of 26.0 mm. An end material made by the above processing was subjected to mirror polishing and its microstructure was observed by an optical microscope. The observation showed that 211 phases of about 1 μm were dispersed. In addition, about 2 μm thick silver was coated onto the surface of the superconducting body by sputtering. This was heat treated at 723 K for 100 hours in an oxygen stream. With the same processing, one oxide superconducting bulk body 610 was made.

For the metal multiple outer periphery reinforcing ring 620, a ring 630 having an outer diameter of 68.0 mm, an inner diameter of 50.05 mm and a height of 26.0 mm, made of aluminum was used as the first metal ring having a high thermal conductivity. Solder was thinly applied to the inner peripheral surface and the outer peripheral surface of the ring. In addition, a ring 640 having an outer diameter of 88.0 mm, an inner diameter of 68.05 mm and a height of 26.0 mm, made of SUS 304 L was used as the second reinforcing ring having a higher strength. Solder was thinly applied to the inner peripheral surface of the ring. Both the first metal ring and the second metal ring are rings having not cut portion.

Next, the first metal ring 630 having a high thermal conductivity and the superconducting bulk body 610 were inserted to the high-strength second metal ring 640 heated to a temperature at which Sn—Zn based solder having a melting point of 466 K (193° C.) is melted. After solder was fitted to each of them, the whole body was cooled to room temperature to bond them, thereby fabricating a superconducting bulk magnet 600.

The resulting oxide superconducting bulk magnet 600 was attached to a cold head of a freezer. After it was placed in a magnetic field of 9.0 T at 95 K and then cooled to 40 K using the freezer, an external magnetic field was demagnetized to zero magnetic field at a rate of 0.2 T/min. As a result, the trapped magnetic flux density of 8.36 T was confirmed on the axial surface of the oxide superconducting bulk magnet 600, and it was confirmed that the oxide superconducting bulk body 610 can be magnetized without breakage by this magnetization.

Next, as a comparative material shown in Comparative Example 1, a columnar shape Gd-based superconducting bulk body 611 having an outer diameter of 50.0 mm and a height of 26.0 mm was produced from a monocrystalline oxide superconducting bulk body produced in the same manner as described above. This was placed in the outer peripheral reinforcing ring 621 having an outer diameter of 88.0 mm, an inner diameter of 50.05 mm and a height of 26.0 mm, made of SUS 316L, manufactured in the same manner as above. They were bonded by solder in the same manner as described above. In this way, an oxide superconducting bulk magnet 601 as a comparative material shown in Comparative Example 1 in FIG. 6 was produced. That is, the comparative material is not provided with an outer peripheral reinforcing ring having a high thermal conductivity and high electric conductivity. Here, the outer peripheral reinforcing ring is a ring having no cut portion.

After attaching the comparative material in the cold head of the freezer in the same manner as described above, placing it in a magnetic field of 9.5 T at 95 K, and then cooling it to 40 K using the freezer, an external magnetic field was demagnetized to zero magnetic field at a rate of 0.2 T/min. At the stage where the magnetization was reduced to 5.2 T in this demagnetization process, a sharp drop in the magnetic flux density was confirmed at the axial center portion of the oxide superconducting bulk magnet 611. After the magnetization experiment, the superconducting bulk body 611 was examined at room temperature. It was confirmed that the superconducting bulk body 611 had cracks, and arc due to quenching occurred to form a trace of melting damage at the broken portion of the superconducting bulk body 611.

Through these experiments, it became clear that, when the outer peripheral reinforcing ring having a high thermal conductivity and a high electrical conductivity was thermally and electrically soldered to the oxide superconducting bulk body, an oxide superconducting bulk magnet having a high trapped magnetic flux density could be obtained without cracking.

Example 2

Figure 7:
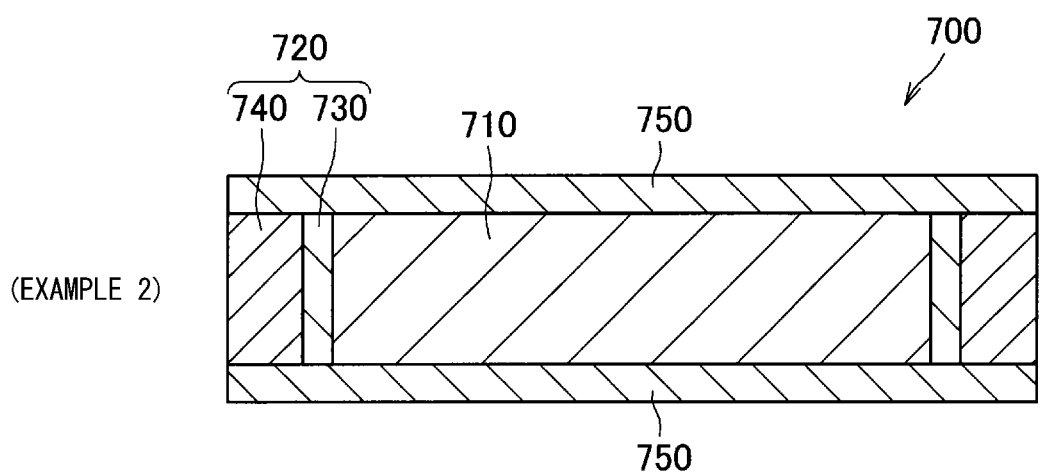
FIG. 7 are cross-sectional views of an oxide superconducting bulk magnet according to Example 2 and a comparative material with respect to Example 2 taken along a central axis line.
Figure 7:
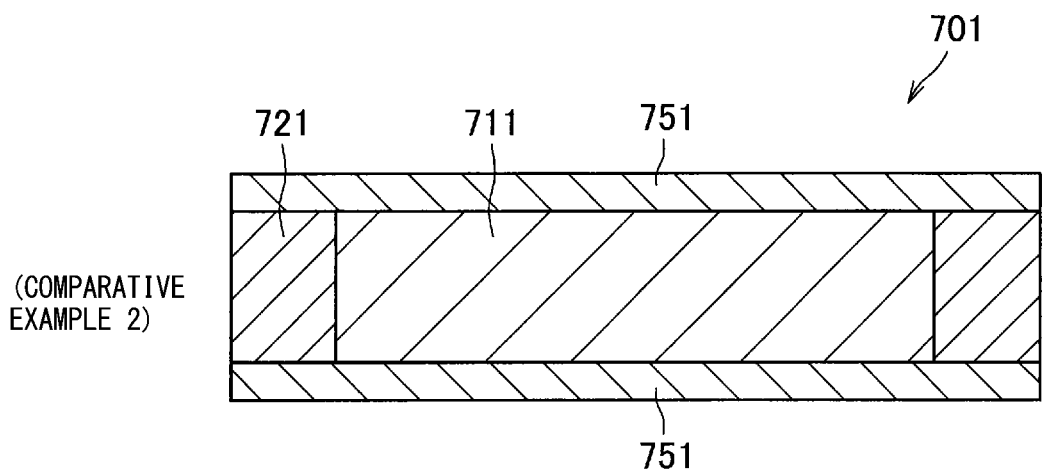

In the superconducting bulk magnet 700 of Example 2 shown in FIG. 7, Eu—Ba—Cu—O-based oxide superconducting bulk body 710 was used. First, commercially available powders of europium (Eu), barium (Ba) and copper (Cu) having a purity of 99.9% by mass were weighed at a molar ratio of Eu:Ba:Cu=1.6:2.3:3.3 to form a mixed powder, and 1.0% by mass of $CeO_2$ and 10% by mass of silver were added thereto. This weighed powder was thoroughly kneaded for 1 hour and then calcined for 8 hours at 1173 K in the atmosphere.

Next, the calcined powder was molded into a disc shape using a metal mold. The compact was heated to 1423 K to form a melt, held for 30 minutes, and then seeded during temperature lowering. It was gradually cooled in the temperature range of 1288 K to 1262 K over 180 hours to conduct crystal growth. A monocrystalline superconducting bulk body having a disk shape of a diameter of 60 mm in which the c-axis of crystal orientation of the superconducting phase is substantially parallel to the normal line of the disk plane was obtained. This monocrystalline oxide superconducting bulk body was processed into an oxide superconducting bulk body 710 having an outer diameter of 50.0 mm and a height of 25.0 mm. In addition, about 2 μm thick of silver was coated onto the surface of the superconducting body by sputtering. This was heat treated at 723 K for 100 hours in an oxygen stream.

For the metal multiple outer peripheral reinforcing ring 720, a ring 730 having an outer diameter of 60.0 mm, an inner diameter of 50.05 mm and a height of 23.0 mm, made of oxygen-free copper was used as the first metal ring having a high thermal conductivity, and a ring 740 having an outer diameter of 78.0 mm, an inner diameter of 60.05 mm, and a height of 23.0 mm, made of SUS 316L was used as the higher strength second metal ring, and they were bonded to each other with Sn—Ag based solder. In addition, solder was thinly applied to the inner peripheral surface made of the oxygen-free copper. Both the first metal ring and the second metal ring are rings having no cut portion.

A circular plate 750 having an outer diameter of 78.0 mm and a height of 5.0 mm, made of oxygen-free copper was prepared as a reinforcing plate to be soldered to the upper and lower surfaces of the oxide superconducting bulk body 710, and solder was also thinly applied to the surface to be bonded to the oxide superconducting bulk body 710.

Next, the oxide superconducting bulk material 710 was placed as described below in the outer peripheral reinforcing ring 720 heated to a temperature at which the Sn-based solder having a melting point of 353K (80° C.) is melted. After the solder was fitted to each of them and the reinforcing plate was bonded to the upper and lower surfaces of the oxide superconducting bulk body, the whole body was cooled to room temperature to bond them, thereby fabricating a superconducting bulk magnet 700.

The resulting oxide superconducting bulk magnet 700 was attached to a cold head of a freezer. After it was placed in a magnetic field of 9 T at 95 K and then cooled to 30 K using the freezer, an external magnetic field was demagnetized to zero magnetic field at a rate of 0.1 T/min. As a result, the trapped magnetic flux density of 8.15 T was confirmed on the axial surface of the superconducting bulk magnet, and it was confirmed that the oxide superconducting bulk body 710 could be magnetized without breakage by this magnetization.

After this magnetization experiment, the oxide superconducting bulk magnet 700 was heated from 30 K to 95 K at 1 K/min and the same magnetization test could be repeated.

Next, as a comparative material shown in Comparative Example 2, an oxide superconducting bulk body 711 having an outer diameter of 50.0 mm and a height of 25.0 mm was produced from a monocrystalline oxide superconducting bulk body produced in the same manner as described above.

For the outer peripheral reinforcing ring, SUS 316L outer peripheral reinforcing ring 721 having an outer diameter of 78.0 mm, an inner diameter of 50.05 mm and a height of 23.0 mm was used. As a reinforcing plate, SUS 316 L disc plate 751 having an outer diameter of 78.0 mm and a height 5.0 mm was prepared, and solder was also thinly applied to the connection surface with the oxide superconducting bulk body 711 in the same way. Here, the peripheral reinforcing ring is a ring having no cut portion. Then, as shown in FIG. 7, an oxide superconducting bulk magnet 701 of comparative material fabricated in the same manner was produced. This was attached to the cold head of the freezer in the same manner as above and placed in a magnetic field of 9 T at 95 K. After cooling to 30 K using the freezer, an external magnetic field was demagnetized to zero magnetic field at a rate of 0.1 T/min. Similarly, the trapped magnetic flux density of 8.15 T was confirmed on the axial surface of the oxide superconducting bulk magnet 701, and it was confirmed that the superconducting bulk body 711 could be magnetized without breakage by this magnetization.

However, after the magnetization experiment, the temperature of the oxide superconducting bulk magnet 701 was increased from 30 K to 95 K at a rate of 1K/min. When the temperature was elevated to 47 K, a sharp drop in the trapped magnetic flux density was confirmed. The temperature was increased to room temperature and the oxide superconducting bulk body 711 was examined. Cracks were observed in the superconducting bulk body 711. It was further confirmed that arc due to quenching phenomenon occurred and a trace of melting damage occurred in the broken portion of the superconducting bulk body 711.

From these experiments, it became clear that, when the outer reinforcing ring having high thermal conductivity and/or high electrical conductivity and the reinforcing plate were thermally and electrically soldered to the oxide superconducting bulk body, an oxide superconducting bulk magnet having a high trapped magnetic flux density can be repeatedly obtained without generating cracks to the superconducting body.

Example 3

Figure 8:
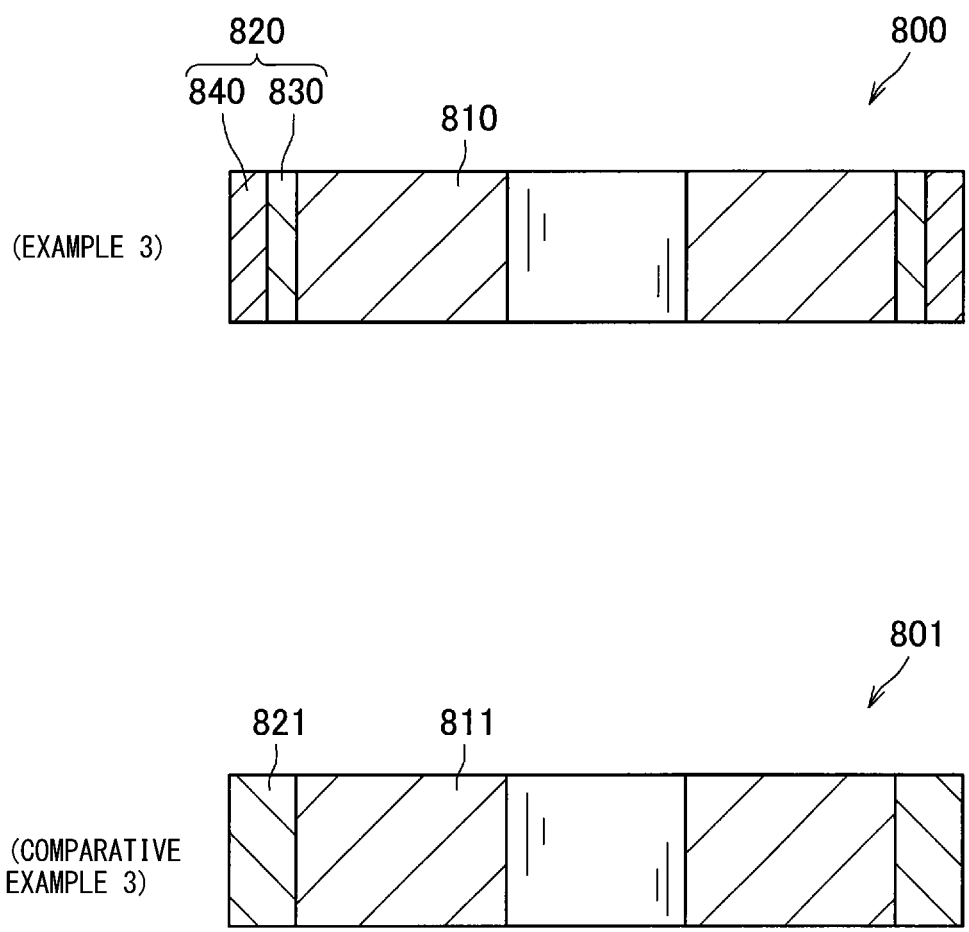
FIG. 8 are cross-sectional views of a ring-shaped oxide superconducting bulk magnet according to Example 3 and a comparative material with respect to Example 3 taken along a center axis line.

In the superconducting bulk magnet 800 of Example 3 shown in FIG. 8, Eu—Ba—Cu—O-based oxide superconducting bulk body 810 was used. First, commercially available powders of europium (Eu), barium (Ba) and copper (Cu) having a purity of 99.9% by mass were weighed at a molar ratio of Eu:Ba:Cu=1.6:2.3:3.3 to form a mixed powder, and 0.6% by mass of Pt and 8% by mass of silver were added thereto. This weighed powder was thoroughly kneaded for 1 hour and then calcined for 8 hours at 1173 K in the atmosphere.

Next, the calcined powder was molded into a disc shape using a metal mold. The compact was heated to 1423 K to form a melt, held for 30 minutes, and the melt was seeded in the course of temperature lowering. It was slowly cooled in the temperature range of 1288 K to 1262 K over 180 hours to conduct crystal growth. A monocrystalline oxide superconducting bulk body having a disk shape of a diameter of 65 mm in which the c-axis of crystal orientation of the superconducting phase is substantially parallel to the normal line of the disk plane was obtained. This monocrystalline oxide superconducting bulk body was processed to prepare an oxide superconducting bulk body 800 having an outer diameter of 58.0 mm, an inner diameter of 18 mm and a height of 25.0 mm. In addition, about 2 μm thick of silver was coated on the surface of the superconducting body by sputtering. This was heat treated at 723 K for 100 hours in an oxygen stream.

Further, for the metal multiple outer peripheral reinforcing ring 820, a ring 830 having a diameter of 64.0 mm, an inner diameter of 58.05 mm and a height of 25.0 mm made of silver was used as the first metal ring having high thermal conductivity, and a ring 840 having an outer diameter of 88.0 mm, an inner diameter of 64.05 mm and a height of 25.0 mm made of SUS 316 was used as the second higher-strength metal ring, and these were bonded with Sn—Bi based solder. Solder was also thinly applied to the inner peripheral surface of the silver ring 830. Both the first metal ring and the second metal ring are rings having no cut portion.

Next, the oxide superconducting bulk body 810 was placed in the outer peripheral reinforcing ring 820 heated to a temperature at which the Sn—In based solder having a melting point of 403K (130° C.) is melted. After the solder was fitted to each of them and the whole body was cooled to room temperature to bond them, thereby fabricating a superconducting bulk magnet 800.

The resulting ring-shaped oxide superconducting bulk magnet 800 was attached to a cold head of a freezer, placed in a magnetic field of 8.5 T at 95 K and cooled to 20 K using the freezer, and then an external magnetic field was demagnetized to a zero magnetization at a rate of 0.1 T/min. As a result, the trapped magnetic flux density of 8.24 T was confirmed at the center on the axis of the ring type oxide superconducting bulk magnet 800, and it was confirmed that the oxide superconducting bulk body 810 could be magnetized without breakage by this magnetization.

After this magnetization experiment, the oxide superconducting bulk magnet 800 was heated from 20 K to 95 K at 1 K/min, and the similar magnetization tests could be repeated.

Next, as a comparative material shown in Comparative Example 3, a ring-shaped oxide superconducting bulk body 811 having an outer diameter of 58.0 mm, an inner diameter of 18 mm, and a height of 25.0 mm was produced from a monocrystalline superconducting bulk body produced in the same manner as described above.

Further, for the outer peripheral reinforcing ring 821, a ring made of SUS 316L having an outer diameter of 88.0 mm, an inner diameter of 58.05 mm and a height of 25.0 mm was used, and a thin solder was also applied to the connection surface with the oxide superconducting bulk body 811 in the same way. In addition, the outer peripheral reinforcing ring is a ring having no cut portion. Then, an oxide superconducting bulk magnet 801 of a comparative material produced in the same manner as shown in Comparative Example 3 in FIG. 8 was produced. This was attached to the cold head of the freezer in the same manner as above and placed in a magnetic field of 8.5 T at 95 K. After cooling to 20 K using the freezer, an external magnetic field was demagnetized to a zero magnetization at a rate of 0.1 T/min. Similarly, the trapped magnetic flux density of 8.24 T was confirmed on the axial surface of the oxide superconducting bulk magnet 801, and it was confirmed that the oxide superconducting bulk body 811 could be magnetized without breakage by this magnetization.

However, after this magnetization experiment, when the temperature of the oxide superconducting bulk magnet 801 was increased from 20 K to 95 K at 1 K/min, it was confirmed that the trapped magnetic flux density sharply decreased at the time when the temperature was elevated to 51 K. As a result of examining the oxide superconducting bulk body 811, cracks were observed in the oxide superconducting bulk body 811, an arc due to a quenching phenomenon occurred, and a trace of melting loss was confirmed at the broken portion of the oxide superconducting bulk body 811.

Through these experiments, it became clear that, when the outer peripheral reinforcing ring having a high thermal conductivity and a high electrical conductivity was thermally and electrically soldered to the oxide superconducting bulk body, an oxide superconducting bulk magnet having a high trapped magnetic flux density could be repeatedly obtained without cracking in the superconducting body.

Example 4

Figure 9:
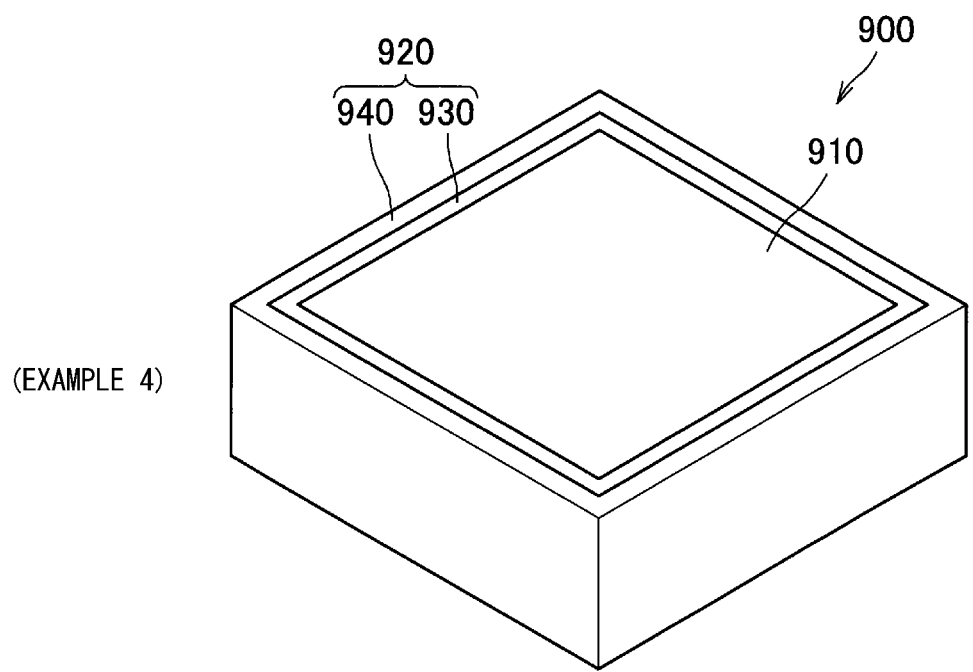
FIG. 9 are schematic perspective views of a polyhedral oxide superconducting bulk magnet according to Example 4 and a comparative material with respect to Example 4.
Figure 9:
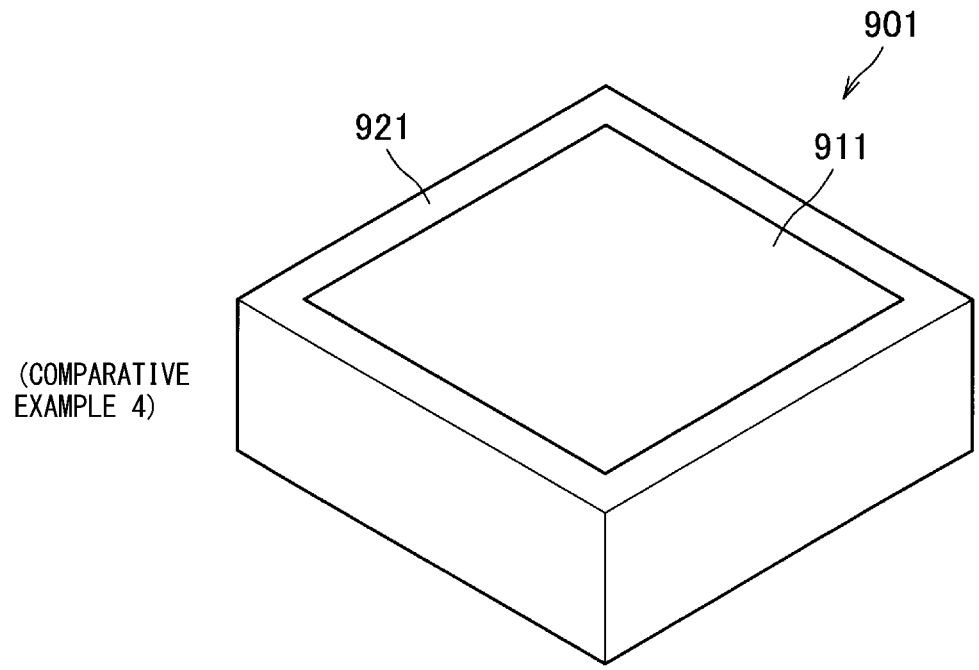

A monocrystalline Gd-based superconducting bulk body having a diameter of 55 mm was obtained in the same manner as in Example 1 shown in FIG. 9. This monocrystalline oxide superconducting bulk body was processed to prepare a polygonal columnar oxide superconducting bulk body 910 having a side length of 38.0 mm and a thickness of 18.0 mm. In addition, about 2 μm thick of silver was coated onto the surface of the superconducting body by sputtering. This was heat-treated at 723 K for 100 hours in an oxygen stream.

In addition, for the metal multiple outer peripheral reinforcing ring 920, a polygonal tubular ring 930 made of aluminum having a side length of 48.0 mm, an inner peripheral side length of 38.1 mm and a thickness of 18.0 mm was used as the metal ring having a high thermal conductivity and a polygonal tubular ring 940 made of SUS 316L having a side length of 58.0 mm, an inner peripheral side length of 48.05 mm and a thickness of 18.0 mm was used as the higher-strength metal ring, and they were bonded with Sn—Pb-based solder. Both the polygonal tubular ring 930 and the polygonal tubular ring 940 are rings having no cut portion.

The oxide superconducting bulk body 910 was placed in the outer peripheral reinforcing ring 920, and they were bonded to each other by a resin to prepare an oxide superconducting bulk magnet 900.

The resulting oxide superconducting bulk magnet 900 was attached to a cold head of a freezer, placed in a magnetic field of 9.0 T at 95K, then cooled to 25 K using the freezer. Then, an external magnetic field was demagnetized to zero magnetic field at a rate of 0.2 T/min. As a result, the trapped magnetic flux density of 8.24 T was confirmed on the axial surface of the oxide superconducting bulk magnet 900, and it was confirmed that the oxide superconducting bulk body 910 could be magnetized without breakage by this magnetization.

Next, as a comparative material shown in Comparative Example 4, a polygonal columnar oxide superconducting bulk body 911 having a side length of 38.0 mm and a thickness of 18.0 mm was prepared. Furthermore, about 2 μm of silver was coated on the surface of the superconducting body by sputtering. This was heat-treated at 723 K for 100 hours in an oxygen stream. In addition, a polygonal tubular ring 921 made of SUS 316 having an outer peripheral side length of 58.0 mm, an inner peripheral side length of 38.1 mm and a thickness of 18.0 mm was used as the outer peripheral reinforcing ring, and a thin solder was also thinly applied to the inner surface of the ring. The outer peripheral reinforcing ring is a ring having no cut portion.

The oxide superconducting bulk magnet 911 of a comparative material shown in FIG. 9 was produced by disposing a polygonal columnar oxide superconducting bulk body 911 in the outer peripheral reinforcing ring 921 and bonding them by solder in the same manner as described above. That is, the comparative material is not provided with an outer peripheral reinforcing ring having a high thermal conductivity and a high electric conductivity.

The comparative material was attached to a cold head of a freezer in the same manner as described above, it was placed in the magnetic field of 9.0 T at 95K, then cooled to 25K by using the freezer. Then, an external magnetic field was reduced to zero magnetization at a rate of 0.2 T/min. At the stage where the magnetization was demagnetized to 3.9 T in this magnetization process, a sharp drop in the magnetic flux density was observed at the axial center portion of the oxide superconducting bulk magnet 901. After the magnetization experiment, the oxide superconducting bulk body 911 was examined at room temperature. As a result, cracks were observed in the oxide superconducting bulk body 911, and arc due to quenching occurred to form a trace of melting damage at the broken portion of the superconducting bulk body 911.

Through these experiments, it became clear that, when the outer peripheral reinforcing ring having a high thermal conductivity was thermally connected to the oxide superconducting bulk body by resin connection, the oxide superconducting bulk having a high trapped magnetic flux density could be obtained without causing cracks in the superconducting body.

Example 5

Six superconducting bulk magnets 900 reinforced with a polygonal tubular metal multiple outer periphery reinforcing ring 920 made of aluminum and SUS 316L were produced as bulk magnet units in the same manner as in Example 4. In addition, six superconducting bulk magnets 901 (bulk magnet units) reinforced with a polygonal tubular outer peripheral ring 921 made of SUS 316 were fabricated in the same manner as Comparative Example 4.

Figure 10:
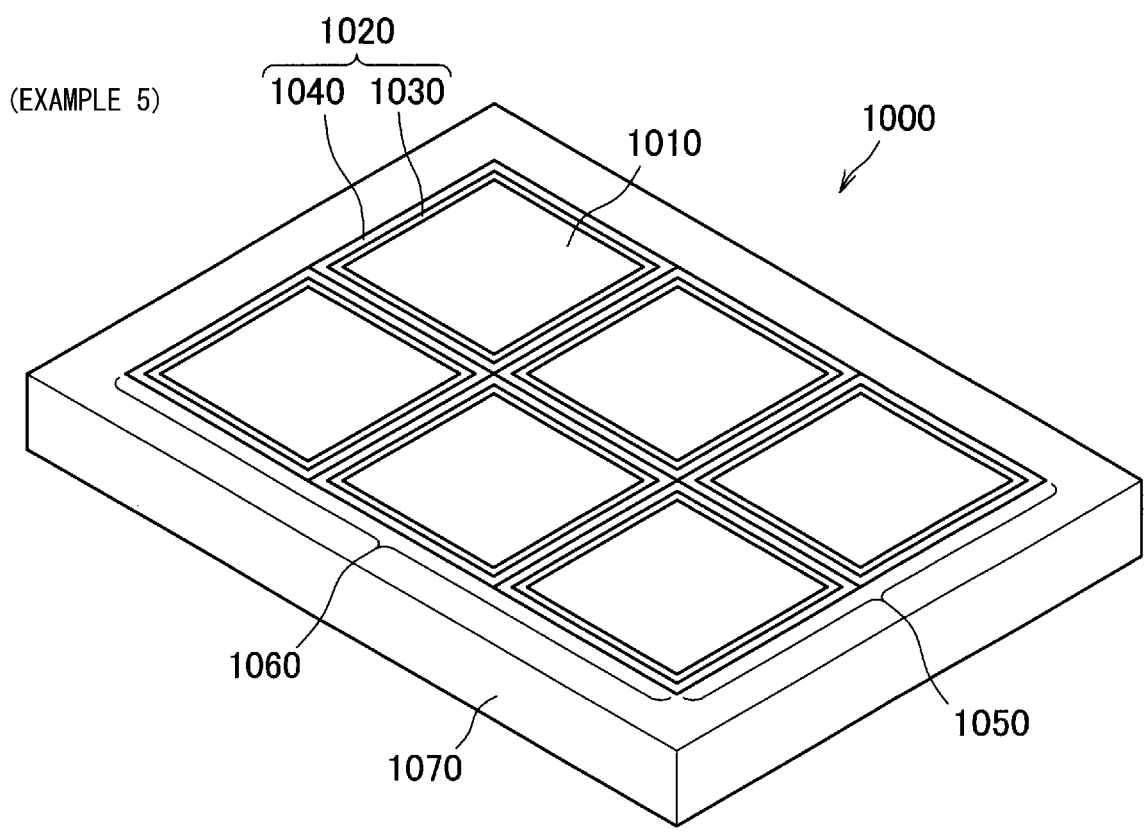
FIG. 10 are schematic perspective views of an oxide superconducting bulk magnet according to Example 5 and a comparative material with respect to Example 5.
Figure 10:
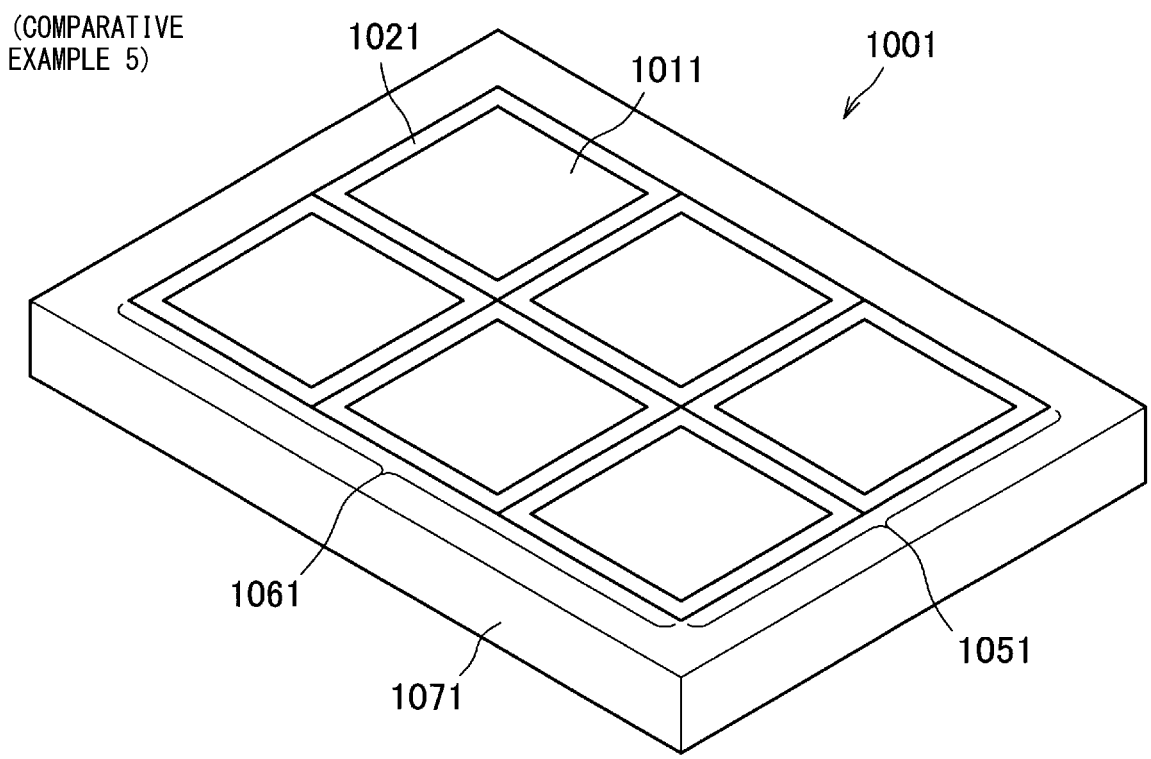

These were placed in a polygonal tubular SUS 316L aggregate outer peripheral reinforcing body having outer periphery side lengths of 194.0 mm and 136.0 mm, inner periphery side lengths of 174.3 mm and 116.2 mm and a height of 18 mm. The resin having an electrical conductivity was cured at room temperature. The aggregate-type oxide superconducting bulk magnet 1000 using the metal multiple outer peripheral ring including an aluminum outer peripheral ring shown in FIG. 10 was designated as Example 5, and Comparative Material 1001 using a polygonal tubular outer peripheral ring made of SUS 316 shown in FIG. 10 was designated as Comparative Example 5. That is, the comparative material is not provided with an outer peripheral reinforcing ring having a high thermal conductivity and a high electric conductivity. Here, the aggregate outer peripheral reinforcement body has a shape having no cut portion.

The resulting aggregate-type oxide superconducting bulk magnet 1000 was attached to a cold head of a freezer, placed in a magnetic field of 9.0 T at 95K, and cooled to 25 K by using the freezer. Then, an external magnetic field was demagnetized to zero magnetization at a rate of 0.2 T/min. As a result, the trapped magnetic flux density of 8.10 T was observed on the axial surface of the oxide superconducting bulk body 1010 in the center of the three rows, and it was confirmed that the oxide superconducting bulk body 1010 could be magnetized without breakage by this magnetization.

The comparative material 1001 was attached to the cold head of the freezer in the same manner as described above, placed in a magnetic field of 9.0 T at 95K, then cooled to 25 K by using the freezer. Then, the external magnetic field was demagnetized to zero magnetization at a rate of 0.2 T/min. At the stage where the magnetization was reduced to 3.6 T in this magnetizing process, a sharp drop in magnetic flux density was observed on the axial surface of the oxide superconducting bulk body 1011 in center of the three rows. After the magnetization experiment, the superconducting bulk body 1011 was examined at room temperature. As a result, cracks were observed in the oxide superconducting bulk body 1011, and an arc due to quenching phenomenon occurred to form a trace of melting damage at the broken portion of the superconducting bulk body 1011.

Through these experiments, it became clear that, when the bulk magnet units wherein the outer peripheral reinforcing ring having a high thermal conductivity was thermally connected to the oxide superconducting bulk body were resin connected in an aggregate type outer peripheral reinforcing body to form an aggregate of the bulk magnet units, the aggregate-type oxide superconducting magnet having a high trapped magnetic flux density could be obtained without causing cracks in the superconducting body.

Although the preferred embodiments of the present invention have been described in detail with reference to the accompanying drawings, the present invention is not limited to such examples. A person with ordinary knowledge in the technical field to which the present invention pertains can clearly conceive various modifications or modifications within the scope of the technical idea described in the claims. It is understood that these are naturally within the technical scope of the present invention.

DESCRIPTION OF SYMBOLS

100 Oxide superconducting bulk magnet
110 Oxide superconducting bulk body
120 Outer peripheral reinforcing ring
130 First metal ring (metal ring having a high thermal conductivity)
140 Second metal ring (high strength metal ring)
180 Conductive material
181 Solder
182 Ag (Ag alloy)
200 Oxide superconducting bulk magnet
210 Oxide superconducting bulk body
220 Outer peripheral reinforcing ring
230 First metal ring (metal ring having a high thermal conductivity)
240 Second metal ring (high strength metal ring)
250 Reinforcing plate
300 Ring-shaped oxide superconducting bulk magnet
310 Ring-shaped oxide superconducting bulk body
320 Outer peripheral reinforcing ring
330 First metal ring (metal ring having a high thermal conductivity)
340 Second metal ring (high strength metal ring)
400 Polygonal columnar shaped oxide superconducting bulk magnet
411 Polygonal columnar shaped oxide superconducting bulk body
421 Polygonal tubular outer peripheral reinforcing ring
431 First metal ring (polygonal tubular metal ring having a high thermal conductivity)
441 Second metal ring (high strength polygonal tubular metal ring)
412 Hexagonal oxide superconducting bulk body
422 Hexagonal outer peripheral reinforcing ring
432 First metal ring (hexagonal metal ring having a high thermal conductivity)

442 Second metal ring (high strength hexagonal metal ring)
500 Aggregate-type oxide superconducting bulk magnet
510 Ring-shaped oxide superconducting bulk body
520 Outer peripheral reinforcing ring
530 First metal ring (polygonal tubular metal ring having a high thermal conductivity)
540 Second metal ring (high strength polygonal tubular metal ring)
550 Bulk magnet unit
560 Aggregate
570 Polygonal tubular aggregate outer peripheral reinforcement
600 Oxide superconducting bulk magnet
610 Oxide superconducting bulk body
620 Outer peripheral reinforcing ring
630 First metal ring (metal ring having a high thermal conductivity)
640 Second metal ring (higher strength metal ring)
601 Oxide superconducting bulk magnet
611 Oxide superconducting bulk body
621 Outer peripheral reinforcing ring
700 Oxide superconducting bulk magnet
710 Oxide superconducting bulk body
720 Outer peripheral reinforcing ring
730 First metal ring (metal ring having a high thermal conductivity)
740 Second metal ring (high strength metal ring)
750 Reinforcing plate
701 Oxide superconducting bulk magnet
711 Oxide superconducting bulk body
721 Outer peripheral reinforcing ring
751 Reinforcing plate
800 Ring-shaped oxide superconducting bulk magnet
810 Ring-shaped oxide superconducting bulk body
820 Outer peripheral reinforcing ring
830 First metal ring (metal ring having a high thermal conductivity)
840 Second metal ring (high strength metal ring)
801 Ring-shaped oxide superconducting bulk magnet
811 Ring-shaped oxide superconducting bulk body
821 Outer peripheral reinforcing ring
900 Polygonal columnar oxide superconducting bulk magnet
910 Polygonal columnar oxide superconducting bulk body
920 polygonal tubular outer peripheral reinforcing ring
930 First metal ring (polygonal tubular metal ring having a high thermal conductivity)
940 Second metal ring (high strength polygonal tubular metal ring)
901 Polygonal columnar oxide superconducting bulk magnet
911 Polygonal columnar oxide superconducting bulk body
921 Polygonal tubular outer peripheral reinforcing ring
1000 Aggregate type oxide superconducting bulk magnet
1010 Polygonal columnar oxide superconducting bulk body
1020 Polygonal tubular outer peripheral reinforcing ring
1030 First metal ring (polygonal tubular metal ring having a high thermal conductivity)
1040 Second metal ring (high strength polygonal tubular metal ring)
1050 Bulk magnet unit
1060 Aggregate
1070 Polygonal tubular aggregate outer peripheral reinforcing body
1001 Aggregate type oxide superconducting bulk magnet for comparison
1011 Polygonal columnar oxide superconducting bulk body
1021 Polygonal tubular outer peripheral reinforcing ring
1051 Bulk magnet unit
1061 Aggregate
1071 Polygonal tubular aggregate outer peripheral portion reinforcing body

The invention claimed is:

1. An oxide superconducting bulk magnet comprising
an oxide superconducting bulk body wherein $RE_2BaCuO_5$ is dispersed in a monocrystalline $RE_1Ba_2Cu_3O_y$, in which RE is one or more elements selected from Y or a rare earth element, and $6.8 \le y \le 7.1$; and
an outer peripheral reinforcing ring fitted to the outer periphery of the oxide superconducting bulk body,
wherein the outer peripheral reinforcing ring is made of a plurality of metal rings having a multiple ring structure in the radial direction, and has a shape with no cut portion,
at least one of the plurality of metal rings has a thermal conductivity of 20 W/(m·K) or more at a temperature of 20 to 70 K and at least one of the plurality of metal rings has a higher strength than the metal ring having a thermal conductivity of 20 W/(m·K) or more,
wherein the metal ring at the innermost periphery among the plurality of metal rings and the oxide superconducting bulk body are bonded with Sn based solder.

2. The oxide superconducting bulk magnet according to claim 1, wherein the metal ring at the innermost periphery among the plurality of metal rings is the metal ring having a thermal conductivity of 20 W/(m·K) or more at a temperature 20 to 70 K.

3. The oxide superconducting bulk magnet according to claim 2, wherein the material of the metal ring having a thermal conductivity of 20 W/(m·K) or more is of copper, aluminum or silver.

4. The oxide superconducting bulk magnet according to claim 2, wherein the material of the metal ring having a higher strength than the metal ring having a thermal conductivity of 20 W/(m·K) or more is of copper alloy, aluminum alloy or stainless steel.

5. The oxide superconducting bulk magnet according to claim 2, wherein the metal ring at the innermost periphery among the plurality of metal rings and the oxide superconducting bulk body are bonded with Sn based solder.

6. The oxide superconducting bulk magnet according to claim 2, wherein a reinforcing plate made of copper, aluminum or silver is connected to the oxide superconducting bulk magnet such that the reinforcing plate covers at least one of the upper surface and the lower surface of the oxide superconducting bulk magnet.

7. The oxide superconducting bulk magnet according to claim 1, wherein the material of the metal ring having a thermal conductivity of 20 W/(m·K) or more is of copper, aluminum or silver.

8. The oxide superconducting bulk magnet according to claim 7, wherein the material of the metal ring having a higher strength than the metal ring having a thermal conductivity of 20 W/(m·K) or more is of copper alloy, aluminum alloy or stainless steel.

9. The oxide superconducting bulk magnet according to claim 7, wherein the metal ring at the innermost periphery among the plurality of metal rings and the oxide superconducting bulk body are bonded with Sn based solder.

10. The oxide superconducting bulk magnet according to claim 7, wherein a reinforcing plate made of copper, aluminum or silver is connected to the oxide superconducting bulk magnet such that the reinforcing plate covers at least one of the upper surface and the lower surface of the oxide superconducting bulk magnet.

11. The oxide superconducting bulk magnet according to claim 1, wherein the material of the metal ring having a higher strength than the metal ring having a thermal conductivity of 20 W/(m·K) or more is of copper alloy, aluminum alloy or stainless steel.

12. The oxide superconducting bulk magnet according to claim 11, wherein the metal ring at the innermost periphery among the plurality of metal rings and the oxide superconducting bulk body are bonded with Sn based solder.

13. The oxide superconducting bulk magnet according to claim 11, wherein a reinforcing plate made of copper, aluminum or silver is connected to the oxide superconducting bulk magnet such that the reinforcing plate covers at least one of the upper surface and the lower surface of the oxide superconducting bulk magnet.

14. The oxide superconducting bulk magnet according to claim 1, wherein a thin film layer of silver or a silver alloy is interposed at the interface between the oxide superconducting bulk body and the solder.

15. The oxide superconducting bulk magnet according to claim 1, wherein a reinforcing plate made of copper, aluminum or silver is connected to the oxide superconducting bulk magnet such that the reinforcing plate covers at least one of the upper surface and the lower surface of the oxide superconducting bulk magnet.

16. The oxide superconducting bulk magnet according to claim 1, wherein the oxide superconducting bulk body has a columnar shape and the outer peripheral reinforcing ring has a tubular shape.

17. The oxide superconducting bulk magnet according to claim 1, wherein the oxide superconducting bulk body has a tubular shape and the outer peripheral reinforcing ring has a tubular shape.

18. The oxide superconducting bulk magnet according to claim 1, wherein the oxide superconducting bulk body has a polygonal columnar shape and the outer peripheral reinforcing ring has a polygonal tubular shape.

19. An aggregated oxide superconducting bulk magnet comprising
an aggregate formed by making the oxide superconducting bulk magnet according to claim 1 as a bulk magnet unit and arranging a plurality of the bulk magnet units in parallel, and
an outer peripheral reinforcing body of the aggregate, covering an outer periphery of the aggregate,
wherein the aggregate is formed so that the outer peripheral reinforcing rings of adjacent bulk magnet units are in contact with each other in parallel arrangement, wherein the outer peripheral reinforcing body of the aggregate is formed of a member having a higher strength than the metal ring having a thermal conductivity of 20 W/m·K or more at a temperature of 20 K to 70 K in the outer peripheral reinforcing ring.

* * * * *